(12) United States Patent
Faxér et al.

(10) Patent No.: US 11,251,843 B2
(45) Date of Patent: Feb. 15, 2022

(54) METHODS AND DEVICES FOR DETERMINING PRECODER PARAMETERS IN A WIRELESS COMMUNICATION NETWORK

(71) Applicant: TELEFONAKTIEBOLAGET LM ERICSSON (PUBL), Stockholm (SE)

(72) Inventors: Sebastian Faxér, Järfälla (SE); Svante Bergman, Hägersten (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/829,874

(22) Filed: Mar. 25, 2020

(65) Prior Publication Data

US 2020/0228172 A1 Jul. 16, 2020

Related U.S. Application Data

(63) Continuation of application No. 16/421,203, filed on May 23, 2019, now Pat. No. 10,615,856, which is a
(Continued)

(51) Int. Cl.
*H04B 7/06* (2006.01)
*H04B 7/0456* (2017.01)
(Continued)

(52) U.S. Cl.
CPC ......... *H04B 7/0465* (2013.01); *H04B 7/0408* (2013.01); *H04B 7/0417* (2013.01);
(Continued)

(58) Field of Classification Search
USPC ........ 370/252, 328, 329; 375/219, 267, 295, 375/316
See application file for complete search history.

(56) References Cited

U.S. PATENT DOCUMENTS

2007/0121741 A1   5/2007   Tang et al.
2008/0051150 A1   2/2008   Tsutsui
(Continued)

FOREIGN PATENT DOCUMENTS

CN   101908921 A   12/2010
CN   102783235 A   11/2012
(Continued)

OTHER PUBLICATIONS

Md. Saifur Rahman, et al., Linear Combination Codebook Based CSI Feedback Scheme for FD-MIMO Systems, 2015 IEEE Globecom Workshops (GC Wkshps), San Diego, CA, 2015, pp. 1-6.
(Continued)

*Primary Examiner* — Shawkat M Ali

(57) ABSTRACT

A method and a device for sending parameters of a precoder in a wireless communication system are disclosed. According to one aspect, the method comprises: sending, to a network node, an indication of a subset of beams selected from a plurality of orthogonal beams and an indication of power levels of the selected subset of beams, for a first frequency granularity; and sending, to the network node, an indication of phases of the selected subset of beams, for a second frequency granularity, wherein the indication of the selected beams, the indication of the power levels of the selected subset of beams and the indication of the phases of the selected subset of beams are part of the parameters of the precoder.

14 Claims, 18 Drawing Sheets

1000

Sending, to the network node, a subset of beams selected from a plurality of orthogonal beams and power levels of the selected subset of beams, for a first frequency granularity 1010

Sending, to the network node, phases of the selected subset of beams, for a second frequency granularity, wherein the selected subset of beams, the power levels and the phases of the selected subset of beams are part of the parameters of the precoder 1020

Related U.S. Application Data continuation of application No. 15/520,505, filed as application No. PCT/IB2017/051803 on Mar. 29, 2017, now Pat. No. 10,333,596.

(60) Provisional application No. 62/316,820, filed on Apr. 1, 2016, provisional application No. 62/316,857, filed on Apr. 1, 2016, provisional application No. 62/315,972, filed on Mar. 31, 2016.

(51) Int. Cl.

| | | |
|---|---|---|
| *H04B 7/0417* | (2017.01) | |
| *H04B 7/0408* | (2017.01) | |
| *H04B 7/0452* | (2017.01) | |
| *H04B 7/08* | (2006.01) | |
| *H04L 5/00* | (2006.01) | |
| *H04W 72/04* | (2009.01) | |

(52) U.S. Cl.
CPC ......... *H04B 7/0452* (2013.01); *H04B 7/0456* (2013.01); *H04B 7/0478* (2013.01); *H04B 7/0617* (2013.01); *H04B 7/0626* (2013.01); *H04B 7/0634* (2013.01); *H04B 7/0639* (2013.01); *H04B 7/0695* (2013.01); *H04B 7/088* (2013.01); *H04L 5/0048* (2013.01); *H04B 7/0469* (2013.01); *H04W 72/0446* (2013.01)

(56) References Cited

U.S. PATENT DOCUMENTS

| | | |
|---|---|---|
| 2009/0154411 A1 | 6/2009 | Kikuchi et al. |
| 2011/0064156 A1 | 3/2011 | Kim et al. |
| 2011/0149945 A1 | 6/2011 | Nakao et al. |
| 2012/0033566 A1 | 2/2012 | Porat et al. |
| 2013/0107915 A1 | 5/2013 | Benjebbour et al. |
| 2013/0163457 A1 | 6/2013 | Kim et al. |
| 2013/0182787 A1 | 7/2013 | Kakishima et al. |
| 2013/0201912 A1 | 8/2013 | Sheng et al. |
| 2013/0223251 A1 | 8/2013 | Li et al. |
| 2014/0177744 A1 | 6/2014 | Krishnamurthy et al. |
| 2014/0301492 A1 | 10/2014 | Xin et al. |
| 2014/0341048 A1* | 11/2014 | Sajadieh ............... H04B 7/0452 370/252 |
| 2014/0341312 A1 | 11/2014 | Lee et al. |
| 2015/0049702 A1 | 2/2015 | Cheng et al. |
| 2015/0049824 A1 | 2/2015 | Kim et al. |
| 2015/0207547 A1 | 7/2015 | Ko et al. |
| 2015/0381253 A1 | 12/2015 | Kim et al. |
| 2016/0013838 A1 | 1/2016 | Zhu et al. |
| 2016/0013849 A1 | 1/2016 | Kakishima et al. |
| 2016/0036507 A1 | 2/2016 | Wang et al. |
| 2016/0072562 A1 | 3/2016 | Onggosanusi et al. |
| 2016/0127021 A1 | 5/2016 | Noh et al. |
| 2016/0173180 A1 | 6/2016 | Cheng et al. |
| 2016/0192383 A1 | 6/2016 | Hwang et al. |
| 2016/0323022 A1 | 11/2016 | Rahman et al. |
| 2017/0012684 A1 | 1/2017 | Zhang et al. |
| 2017/0041113 A1 | 2/2017 | Park |
| 2017/0222703 A1 | 8/2017 | Thomas et al. |
| 2017/0238323 A1 | 8/2017 | Marinier et al. |
| 2020/0044717 A1 | 2/2020 | Liu |

FOREIGN PATENT DOCUMENTS

| | | |
|---|---|---|
| CN | 104009785 A | 8/2014 |
| CN | 104202073 A | 12/2014 |
| EP | 3116140 A2 | 1/2017 |
| JP | 2009152688 A | 7/2009 |
| JP | 2014-175810 A | 9/2014 |
| JP | 2017515344 A | 6/2017 |
| KR | 10-2008-0019174 A | 3/2008 |
| KR | 10-2008-0022031 A | 3/2008 |
| KR | 10-2008-0022033 A | 3/2008 |
| RU | 2515283 C2 | 9/2012 |
| RU | 2538735 C2 | 7/2014 |
| WO | 2011/150559 A1 | 12/2011 |
| WO | 2012/007838 A1 | 1/2012 |
| WO | 2015018030 A1 | 2/2015 |
| WO | WO2015147814 A1 | 10/2015 |
| WO | 2016003235 A1 | 1/2016 |

OTHER PUBLICATIONS

International Search Report and Written Opinion from related application PCT/IB2017/051805, dated Jun. 1, 20217.

International Search Report and Written Opinion from related application PCT/IB2017/051804, dated Jun. 1, 2017.

International Search Report and Written Opinion from corresponding application PCT/IB2017/051803, dated Jun. 2, 2017.

\* cited by examiner

METHODS AND DEVICES FOR DETERMINING PRECODER PARAMETERS IN A WIRELESS COMMUNICATION NETWORK

CROSS-REFERENCE TO RELATED APPLICATIONS

This application is a continuation of U.S. patent application Ser. No. 16/421,203, filed May 23, 2019, which is a continuation of U.S. patent application Ser. No. 15/520,505, filed Apr. 20, 2017, which is a 35 U.S.C. § 371 national phase filing of International Application No. PCT/IB2017/051803, filed Mar. 29, 2017, which claims the benefit of the following provisional patent applications:

1) the prior U.S. provisional patent application entitled "FACTORIZED PRECODER STRUCTURE FOR MULTI-BEAM PRECODER CODEBOOKS", application No. 62/316,820, filed Apr. 1, 2016, in the names of Sebastian FAXER and Svante BERGMAN;
2) the prior U.S. provisional patent application entitled "FREQUENCY PARAMETRIZATION OF BEAM CO-PHASING FOR MULTI-BEAM PRECODER CODEBOOKS", application No. 62/316,857, filed Apr. 1, 2016, in the names of Sebastian FAXER and Svante BERGMAN.
3) the prior U.S. provisional patent application entitled "BEAM SPACE ROTATION FEEDBACK FOR MULTI-BEAM PRECODER CODEBOOKS", application No. 62/315,972, filed Mar. 31, 2016, in the names of Sebastian FAXER and Svante BERGMAN; The content of the 3 provisional applications are incorporated herein by reference in their entirety.

FIELD

The present disclosure relates to wireless communications, and in particular, to a factorized precoder structure for multi-beam precoder codebooks.

BACKGROUND

Multi-antenna techniques can significantly increase the data rates and reliability of a wireless communication system. The performance is particularly improved if both the transmitter and the receiver are equipped with multiple antennas, which results in a multiple-input multiple-output (MIMO) communication channel. Such systems and/or related techniques are commonly referred to as MIMO.

The Long Term Evolution (LTE) standard is currently evolving with enhanced MIMO support. A component in LTE is the support of MIMO antenna deployments and MIMO related techniques. Currently LTE-Advanced supports an 8-layer spatial multiplexing mode for 8 transmit (Tx) antennas with channel dependent precoding. The spatial multiplexing mode is aimed for high data rates in favorable channel conditions. An illustration of the spatial multiplexing operation 100 is provided in FIG. 1, where there are $N_T$ antenna 110 ports and $N_T$ inverse fast Fourier transformers (IFFTs) 120.

As seen, the information carrying symbol vector s 130 is multiplied by an $N_T \times r$ precoder matrix W 140, which serves to distribute the transmit energy in a subspace of the $N_T$ (corresponding to $N_T$ antenna ports) dimensional vector space. The precoder matrix W 140 is typically selected from a codebook of possible precoder matrices, and typically indicated by means of a precoder matrix indicator (PMI), which specifies a unique precoder matrix in the codebook for a given number of symbol streams. The r symbols in s 130 each correspond to a layer 150 and r is referred to as the transmission rank. In this way, spatial multiplexing is achieved since multiple symbols can be transmitted simultaneously over the same time/frequency resource element (TFRE). The number of symbols r is typically adapted to suit the current channel properties.

LTE uses Orthogonal Frequency Division Multiplexing (OFDM) in the downlink (and Discrete Fourier Transform (DFT) precoded OFDM in the uplink) and hence the received $N_R \times 1$ vector $y_n$ for a certain TFRE on subcarrier n (or alternatively data TFRE number n) is thus modeled by $$y_n = H_n W s_n + e_n \qquad \text{Equation 1}$$

where $e_n$ is a noise/interference vector obtained as realizations of a random process, and $N_R$ is the number of receive antennas. The precoder W can be a wideband precoder, which is constant over frequency, or frequency selective.

The precoder matrix W is often chosen to match the characteristics of the $N_R \times N_T$ MIMO channel matrix $H_n$, resulting in so-called channel dependent precoding. This is also commonly referred to as closed-loop precoding and essentially strives for focusing the transmit energy into a subspace which is strong in the sense of conveying much of the transmitted energy to the wireless device. In addition, the precoder matrix may also be selected to strive for orthogonalizing the channel, meaning that after proper linear equalization at the wireless device, the inter-layer interference is reduced.

One example method for a wireless device to select a precoder matrix W can be to select the $W_k$ that maximizes the Frobenius norm of the hypothesized equivalent channel:

$$\max_k \left\| \hat{H}_n W_k \right\|_F^2 \qquad \text{Equation 2}$$

Where $\hat{H}_n$ is a channel estimate, possibly derived from Channel State Information Reference Signal (CSI-RS) as described below; $W_k$ is a hypothesized precoder matrix with index k; and $\hat{H}_n W_k$ is the hypothesized equivalent channel.

In closed-loop precoding for the LTE downlink, the wireless device transmits, based on channel measurements in the forward link (downlink), recommendations to the base station, e.g., eNodeB (eNB), of a suitable precoder to use. The base station configures the wireless device to provide feedback according to the wireless device's transmission mode, and may transmit CSI-RS and configure the wireless device to use measurements of CSI-RS to feedback recommended precoding matrices that the wireless device selects from a codebook. A single precoder that is supposed to cover a large bandwidth (wideband precoding) may be fed back. It may also be beneficial to match the frequency variations of the channel and instead feedback a frequency-selective precoding report, e.g., several precoders, one per subband. This is an example of the more general case of channel state information (CSI) feedback, which also encompasses feeding back other information than recommended precoders to assist the base station in subsequent transmissions to the wireless device. Such other information may include channel quality indicators (CQIs) as well as transmission rank indicator (RI).

Given the CSI feedback from the wireless device, the base station determines the transmission parameters it wishes to use to transmit to the wireless device, including the precoding matrix, transmission rank, and modulation and coding scheme (MCS). These transmission parameters may differ from the recommendations the wireless device makes. Therefore, a rank indicator and MCS may be signaled in downlink control information (DCI), and the precoding matrix can be signaled in DCI or the base station can transmit a demodulation reference signal from which the equivalent channel can be measured. The transmission rank, and thus the number of spatially multiplexed layers, is reflected in the number of columns of the precoder W. For efficient performance, it is important that a transmission rank that matches the channel properties is selected.

In LTE Release-10 (Rel-10), a new reference symbol sequence was introduced for the intent to estimate downlink channel state information, the CSI-RS. The CSI-RS provides several advantages over basing the CSI feedback on the common reference symbols (CRS) which were used, for that purpose, in previous releases. First, the CSI-RS is not used for demodulation of the data signal, and thus does not require the same density (i.e., the overhead of the CSI-RS is substantially less). Secondly, CSI-RS provides a much more flexible means to configure CSI feedback measurements (e.g., which CSI-RS resource to measure on can be configured in a wireless device specific manner).

By measuring a CSI-RS transmitted from the base station, a wireless device can estimate the effective channel the CSI-RS is traversing including the radio propagation channel and antenna gains. In more mathematical rigor, this implies that if a known CSI-RS signal x is transmitted, a wireless device can estimate the coupling between the transmitted signal and the received signal (i.e., the effective channel). Hence, if no virtualization is performed in the transmission, the received signal y can be expressed as $$Y = Hx + e \qquad \text{Equation 3}$$

and the wireless device can estimate the effective channel H

Up to eight CSI-RS ports can be configured in LTE Rel-10, that is, the wireless device can estimate the channel from up to eight transmit antennas.

Related to CSI-RS is the concept of zero-power CSI-RS resources (also known as a muted CSI-RS) that are configured just as regular CSI-RS resources, so that a wireless device knows that the data transmission is mapped around those resources. The intent of the zero-power CSI-RS resources is to enable the network to mute the transmission on the corresponding resources, in order to boost the Signal to Interference plus Noise Ratio (SINR) of a corresponding non-zero power CSI-RS, possibly transmitted in a neighbor cell/transmission point. For Release 11 (Rel-11) of LTE, a special zero-power CSI-RS was introduced that a wireless device is mandated to use for measuring interference plus noise. A wireless device can assume that the transmission points (TPs) of interest are not transmitting on the zero-power CSI-RS resource, and the received power can therefore be used as a measure of the interference plus noise.

Based on a specified CSI-RS resource and on an interference measurement configuration (e.g., a zero-power CSI-RS resource), the wireless device can estimate the effective channel and noise plus interference, and consequently also determine the rank, precoding matrix, and MCS to recommend to best match the particular channel.

Some installations are equipped with two dimensional antenna arrays and some of the presented embodiments use such antennas. Such antenna arrays may be (partly) described by the number of antenna columns corresponding to the horizontal dimension $N_h$, the number of antenna rows corresponding to the vertical dimension $N_v$ and the number of dimensions corresponding to different polarizations $N_p$.

The total number of antennas is thus $N = N_h N_v N_p$. It should be pointed out that the concept of an antenna is non-limiting in the sense that it can refer to any virtualization (e.g., linear mapping) of the physical antenna elements. For example, pairs of physical sub-elements could be fed the same signal, and hence share the same virtualized antenna port.

An example of a 4×4 array with cross-polarized antenna elements 200 is shown in FIG. 2, where the horizontal dimension "l" represents $N_h$ and the vertical dimension "m" represents the $N_v$.

Precoding may be interpreted as multiplying the signal with different beamforming weights for each antenna prior to transmission. A typical approach is to tailor the precoder to the antenna form factor, i.e., taking into account $N_h$, $N_v$ and $N_p$ when designing the precoder codebook.

A common type of precoding is to use a DFT-precoder, where the precoder vector used to precode a single-layer transmission using a single-polarized uniform linear array (ULA) with N antennas is defined as $$w_{1D}(k) = \frac{1}{\sqrt{N}} \begin{bmatrix} e^{j2\pi \cdot 0 \cdot \frac{k}{QN}} \\ e^{j2\pi \cdot 1 \cdot \frac{k}{QN}} \\ \vdots \\ e^{j2\pi \cdot (N-1) \cdot \frac{k}{QN}} \end{bmatrix},$$

where $k = 0, 1, \ldots QN-1$ is the precoder index and Q is an integer oversampling factor. A corresponding precoder vector for a two-dimensional uniform planar array (UPA) can be created by taking the Kronecker product of two precoder vectors as $w_{2D}(k, l) = w_{1D}(k) \otimes w_{1D}(l)$. Extending the precoder for a dual-polarized UPA may then be done as $$w_{2D,DP}(k, l, \phi) = \begin{bmatrix} 1 \\ e^{j\phi} \end{bmatrix} \otimes w_{2D}(k, l) = \begin{bmatrix} w_{2D}(k, l) \\ e^{j\phi} w_{2D}(k, l) \end{bmatrix} = \begin{bmatrix} w_{2D}(k, l) & 0 \\ 0 & w_{2D}(k, l) \end{bmatrix} \begin{bmatrix} 1 \\ e^{j\phi} \end{bmatrix},$$

where $e^{j\varphi}$ is a co-phasing factor that may for instance be selected from the QPSK alphabet $$\phi \in \left\{ 0, \frac{\pi}{2}, \pi, \frac{3\pi}{2} \right\}.$$

A precoder matrix $W_{2D,DP}$ for multi-layer transmission may be created by appending columns of DFT precoder vectors as $$W_{2D,DP} = [w_{2D,DP}(k_1, l_1, \varphi_1) w_{2D,DP}(k_2, l_2, \varphi_2) \ldots w_{2D,DP}(k_R, l_R, \varphi_R)],$$

where R is the number of transmission layers, i.e., the transmission rank. In a common special case for a rank-2 DFT precoder, $k_1 = k_2 = k$ and $l_1 = l_2 = l$, meaning that $$W_{2D,DP} = [w_{2D,DP}(k, l, \phi_1) \; w_{2D,DP}(k, l, \phi_2)] = \begin{bmatrix} w_{2D}(k, l) & 0 \\ 0 & w_{2D}(k, l) \end{bmatrix} \begin{bmatrix} 1 & 1 \\ e^{j\phi_1} & e^{j\phi_2} \end{bmatrix}.$$

With multi-user MIMO, two or more users in the same cell are co-scheduled on the same time-frequency resource. That is, two or more independent data streams are transmitted to different wireless devices at the same time, and the spatial domain is used to separate the respective streams. By transmitting several streams simultaneously, the capacity of the system can be increased. This however, comes at the cost of reducing the SINR per stream, as the power has to be shared between streams and the streams will cause interference to each-other.

When increasing the antenna array size, the increased beamforming gain will lead to higher SINR, however, as the user throughput depends only logarithmically on the SINR (for large SINRs), it is instead beneficial to trade the gains in SINR for a multiplexing gain, which increases linearly with the number of multiplexed users.

Accurate CSI is required in order to perform appropriate nullforming between co-scheduled users. In the current LTE Release 13 (Rel-13) standard, no special CSI mode for MU-MIMO exists and thus, MU-MIMO scheduling and precoder construction has to be based on the existing CSI reporting designed for single-user MIMO (that is, a PMI indicating a DFT-based precoder, a RI and a CQI). This may prove quite challenging for MU-MIMO, as the reported precoder only contains information about the strongest channel direction for a user and may thus not contain enough information to do proper nullforming, which may lead to a large amount of interference between co-scheduled users, reducing the benefit of MU-MIMO.

A multi-beam precoder may be defined as a linear combination of several DFT precoder vectors as $$w_{MB} = \sum_i c_i \cdot w_{2D,DP}(k_i, l_i, \phi_i),$$

where $\{c_i\}$ may be general complex coefficients. Such a multi-beam precoder may more accurately describe the wireless device's channel and may thus bring an additional performance benefit compared to a DFT precoder, especially for MU-MIMO where rich channel knowledge is desirable in order to perform nullforming between co-scheduled wireless devices.

Existing solutions for MU-MIMO based on implicit CSI reports with DFT-based precoders have problems with accurately estimating and reducing the interference between co-scheduled users, leading to poor MU-MIMO performance.

Multi-beam precoder schemes may lead to better MU-MIMO performance, but at the cost of increased CSI feedback overhead and wireless device precoder search complexity.

SUMMARY

Some embodiments advantageously provide a method and device for determining parameters of a precoder in a wireless communication system. According to a first aspect, the method includes selecting a subset of beams from a plurality of orthogonal beams, obtaining power levels of the selected subset of beams for generating a first factor of the precoder and obtaining phases of the selected subset of beams for generating a second factor of the precoder; wherein the first factor and second factor are part of the parameters of the precoder.

According to a second aspect, there is provided a wireless device for determining parameters of a precoder in a wireless communication system. The wireless device includes processing circuitry including a memory and a processor. The processing circuitry is configured to: select a subset of beams from a plurality of orthogonal beams; obtain power levels of the selected subset of beams for generating a first factor of the precoder; and obtain phases of the selected subset of beams for generating a second factor of the precoder, wherein the first factor and the second factor are part of the parameters of the precoder.

According to a third aspect, there is provided a method for sending parameters of a precoder to a network node in a wireless communication system. The method comprises sending to the network node, a subset of beams selected from a plurality of orthogonal beams and power levels of the selected subset of beams, for a first frequency granularity; and sending, to the network node, phases of the selected subset of beams, for a second frequency granularity, wherein the selected subset of beams, the power levels and the phases of the selected subset of beams are part of the parameters of the precoder.

According to a fourth aspect, there is provided a wireless device for sending parameters of a precoder to a network node in a wireless communication system. The wireless device comprises a processing circuitry including a processor and a memory. The processing circuitry is configured to cause the wireless device to: send to the network node, a subset of beams selected from a plurality of orthogonal beams and power levels of the selected subset of beams, for a first frequency granularity; and send, to the network node, phases of the selected subset of beams, for a second frequency granularity, wherein the selected subset of beams, the power levels and the phases of the selected subset of beams are part of the parameters of the precoder.

According to a fifth aspect, there is provided a method for determining transmission parameters for a wireless device, in a wireless communication system. The method comprises: responsive to transmitting reference signals to the wireless device, receiving precoder parameters which include a subset of beams selected from a plurality of orthogonal beams and power levels of the selected subset of beams for a first frequency granularity, and phases of the selected subset of beams for a second frequency granularity; and determining the transmission parameters based on the received precoder parameters.

According to a sixth aspect, there is provided a network node for determining transmission parameters for a wireless device, in a wireless communication system. The network node comprises a processing circuitry including a processor and a memory. The processing circuitry is configured to cause the network node to: responsive to transmitting reference signals to the wireless device, receive precoder parameters which include a subset of beams selected from a plurality of orthogonal beams and power levels of the selected subset of beams for a first frequency granularity, and phases of the selected subset of beams for a second frequency granularity; and determine the transmission parameters based on the received precoder parameters.

According to a seventh aspect, there is provided a method for determining transmission parameters for a wireless device, in a wireless communication system. The method comprises: in response to transmitting reference signals, receiving precoder parameters which include a subset of beams selected from a plurality of orthogonal beams, a first factor associated with power levels of the selected subset of beams, and a second factor associated with phases of the selected subset of beams; and determining the transmission parameters based on the received precoder parameters.

According to an eighth aspect, there is provided a network node for determining transmission parameters for a wireless device, in a wireless communication. The network node comprises a processing circuitry configured to cause the network node to: in response to transmitting reference signals, receive precoder parameters which include a subset of beams selected from a plurality of orthogonal beams, a first factor associated with power levels of the selected subset of beams, and a second factor associated with phases of the selected subset of beams; and determine the transmission parameters based on the received precoder parameters.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
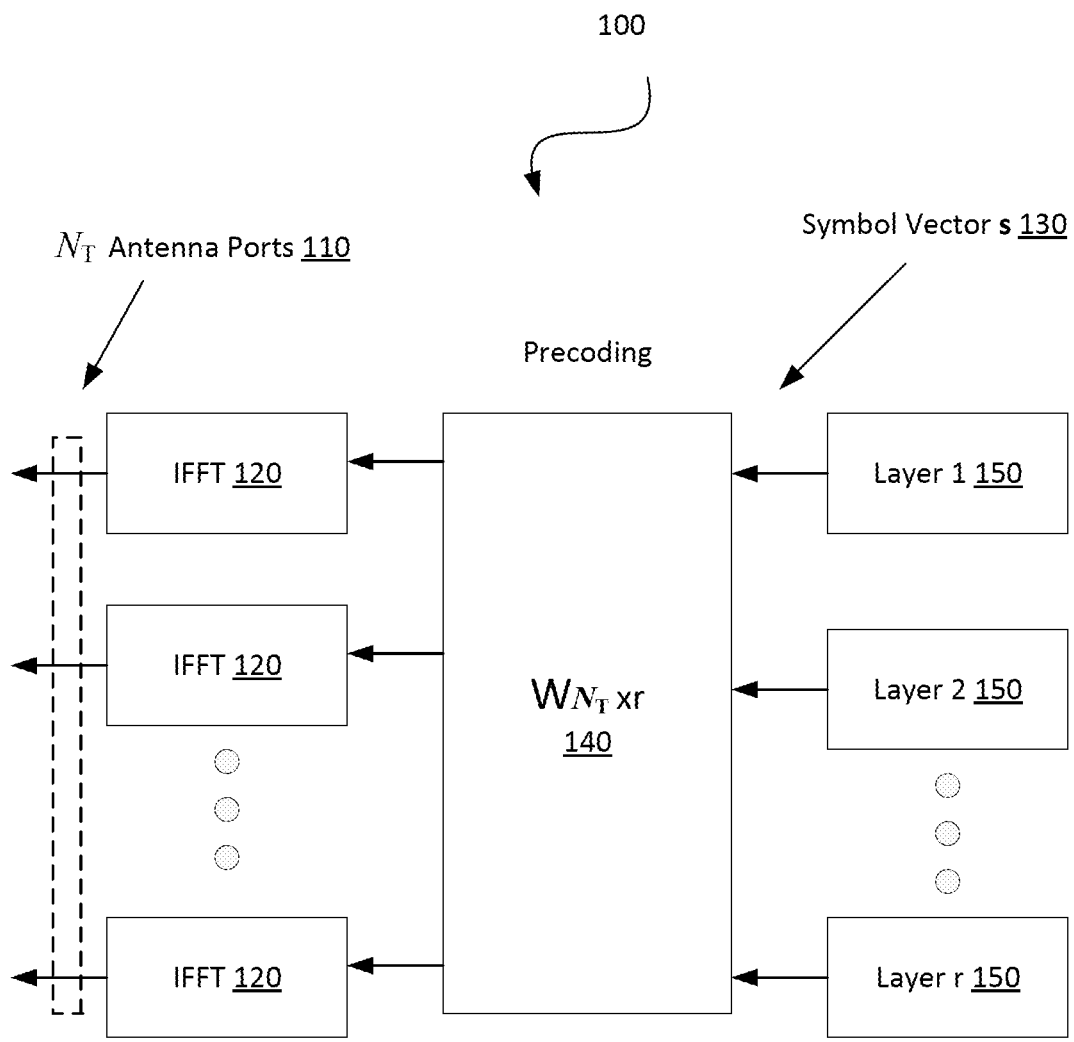
FIG. 1 is a block diagram of a known transmitter implementing digital beam forming.
Figure 2:
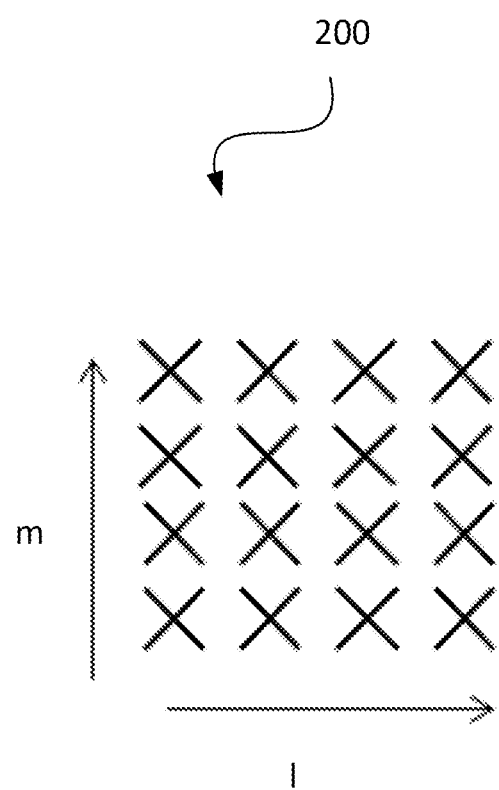
FIG. 2 is an illustration of a planar array of co-polarized antenna elements.

Before describing in detail exemplary embodiments, it is noted that the embodiments reside in combinations of apparatus components and processing steps related to a factorized precoder structure for multi-beam precoder codebooks. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Figure 3:
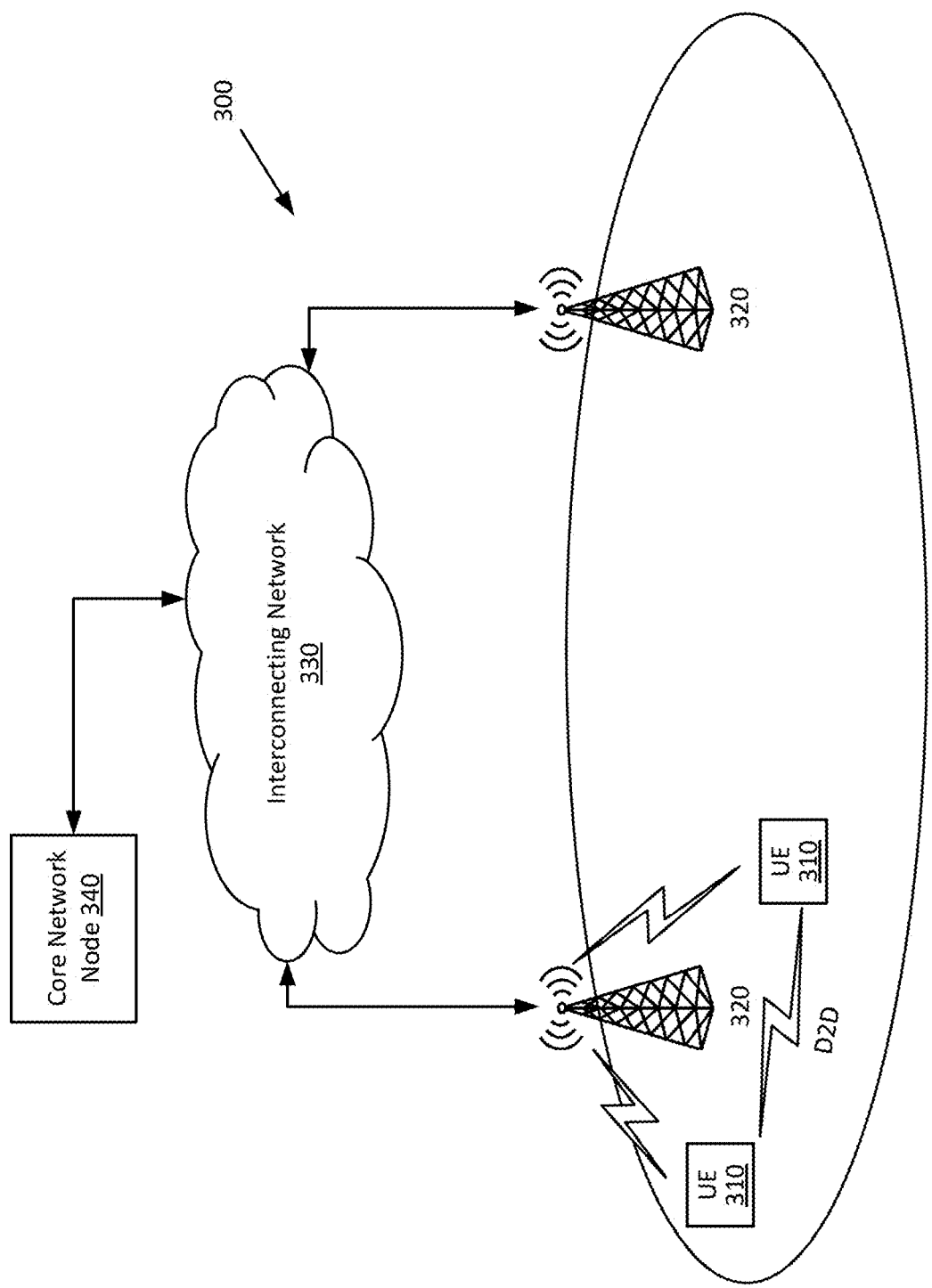
FIG. 3 illustrates a schematic diagram of a wireless communication system/network.

Embodiments of the present disclosure may be implemented in a wireless network such as the example wireless communication network/system illustrated in FIG. 3. However, the embodiments may be implemented in any appropriate type of system using any suitable components.

FIG. 3 illustrates an example of a wireless communication network 300 that may be used for wireless communications. Wireless communication network 300 includes wireless devices 310 (e.g., user equipments, UEs) and a plurality of network nodes 320 (e.g., eNBs, gNBs, base stations, etc.) connected to one or more core network nodes 340 via an interconnecting network 330. Wireless devices 310 within a coverage area may each be capable of communicating directly with network nodes 320 over a wireless interface. In certain embodiments, wireless devices 310 may also be capable of communicating with each other via device-to-device (D2D) communication. In certain embodiments, network nodes 320 may also be capable of communicating with each other, e.g. via an interface (e.g. X2 in LTE or other suitable interface).

As an example, wireless device 310 may communicate with network node 320 over a wireless interface. That is, wireless device 310 may transmit wireless signals and/or receive wireless signals from network node 320. The wireless signals may contain voice traffic, data traffic, control signals, and/or any other suitable information. In some embodiments, an area of wireless signal coverage associated with a network node 320 may be referred to as a cell.

In some embodiments, wireless device 310 may be interchangeably referred to by the non-limiting term user equipment (UE). It refers to any type of wireless device communicating with a network node and/or with another UE in a cellular or mobile communication system. Examples of UE are target device, device to device (D2D) UE, machine type UE or UE capable of machine to machine (M2M) communication, Personal Digital Assistant (PDA), tablet computer, mobile terminals, smart phone, laptop embedded equipped (LEE), laptop mounted equipment (LME), Universal Serial Bus (USB) dongles, narrowband Internet of Things (NB-IoT) UE, etc. Example embodiments of a wireless device 310 are described in more detail below with respect to FIGS. 15-17.

The "network node" can correspond to any type of radio network node or any network node, which communicates with a UE and/or with another network node. Examples of network nodes are Base stations, e.g., a Radio Base Station (RBS), which may be sometimes referred to herein as, e.g., evolved NodeB "eNB", "eNodeB", "NodeB", "B node", "gNB" or BTS (Base Transceiver Station), depending on the technology and terminology used. The base stations may be of different classes such as, e.g., macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the terminals within range of the base stations. In the context of this disclosure, the expression Downlink (DL) is used for the transmission path from the base station to the mobile station. The expression Uplink (UL) is used for the transmission path in the opposite direction i.e., from the mobile station to the base station.

In certain embodiments, network nodes 320 may interface with a radio network controller (not shown). The radio network controller may control network nodes 320 and may provide certain radio resource management functions, mobility management functions, and/or other suitable functions. In certain embodiments, the functions of the radio network controller may be included in the network node 320. The radio network controller may interface with the core network node 340. In certain embodiments, the radio network controller may interface with the core network node 340 via the interconnecting network 330.

The interconnecting network 330 may refer to any interconnecting system capable of transmitting audio, video, signals, data, messages, or any combination of the preceding. The interconnecting network 330 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node 340 may manage the establishment of communication sessions and various other functionalities for wireless devices 310. In certain embodiments, network nodes 320 may interface with one or more other network nodes over an internode interface. For example, network nodes 320 may interface each other over an X2 interface.

Although FIG. 3 illustrates a particular arrangement of network 300, the present disclosure contemplates that the various embodiments described herein may be applied to a variety of networks having any suitable configuration. For example, network 300 may include any suitable number of wireless devices 310 and network nodes 320, as well as any additional elements suitable to support communication between wireless devices or between a wireless device and another communication device (such as a landline telephone). The embodiments may be implemented in any appropriate type of telecommunication system supporting any suitable communication standards and using any suitable components, and are applicable to any radio access technology (RAT) or multi-RAT systems in which the wireless device receives and/or transmits signals (e.g., data).

While certain embodiments are described for New Radio (NR) and/or LTE, the embodiments may be applicable to any RAT, such as UTRA, E-UTRA, narrow band internet of things (NB-IoT), WiFi, Bluetooth, next generation RAT (NR, NX), 4G, 5G, LTE Frequency Division Duplex (FDD)/Time Division Duplex (TDD), etc.

It should be noted that functions described herein as being performed by a base station may be distributed over a plurality of base stations and/or network nodes. Further, although embodiments are described with reference to base stations, it is understood that embodiments can be implemented in or across any suitable network node, of which base stations are a type. Also, the network 300 may allow for Multi-User Multiple Input Multiple Output (MU-MIMO) transmission. As such, network 300 may be referred to as a MU-MIMO wireless communication network or system.

Embodiments provide a precoder structure for multi-beam precoder feedback that utilizes various properties to keep down the feedback overhead. Some embodiments provide increased MU-MIMO performance as compared with known arrangements by having rich precoder feedback with reasonable feedback overhead. Codebooks having multi-beam precoders that have specific structures, allowing for low feedback overhead are disclosed.

Consider first the time-domain channel between a size-N co-polarized uniform linear array (ULA) with $d_\lambda$ antenna element separation in wavelengths and a single receive antenna. The channel matrix may be expressed in the general form $$H(\tau) = h^T(\tau) = \sum_{i=1}^{M} c_i a^T(\theta_i)\delta(\tau - \tau_i)$$

i.e., consisting of a sum of M multi-path components, where $c_i$ is a complex channel coefficient, $$a(\theta) = \begin{bmatrix} 1 \\ e^{j2\pi \cdot 1 \cdot d_\lambda \cos(\theta)} \\ \vdots \\ e^{j2\pi \cdot (N-1) \cdot d_\lambda \cos(\theta)} \end{bmatrix}$$

is an array steering vector, $\theta_i$ is an angle of departure (AoD) relative to the ULA of multi-path component i and $\tau_i$ is its propagation delay.

The frequency-domain representation of the channel matrix is then derived as $$H(f) = h^T(f) = \int_{\tau=-\infty}^{\infty} \sum_{i=1}^{M} c_i a^T(\theta_i)\delta(\tau - \tau_i)e^{-j2\pi f\tau}d\tau =$$

$$\sum_{i=1}^{M} c_i a^T(\theta_i) \int_{\tau=-\infty}^{\infty} \delta(\tau - \tau_i)e^{-j2\pi f\tau}d\tau = \sum_{i=1}^{M} c_i a^T(\theta_i)e^{-j2\pi f\tau_i}$$

Consider now the channel matrix for a certain frequency $f=f_0$. The channel vector then becomes $$h^T(f) = \sum_{i=1}^{M} c_i a^T(\theta_i)e^{-j2\pi f_0 \tau_i} = \sum_{i=1}^{M} \tilde{c}_i a^T(\theta_i),$$

where $\tilde{c}_i$ is another complex coefficient. The optimal precoder that perfectly inverts this channel is the maximum ratio transmission (MRT) precoder $w_{MRT} = (h^T(f))^H = h^*$, wherein * denotes the complex conjugate.

$D_N$ is defined as a size N×N DFT matrix, i.e., the elements of $D_N$ are defined as $$[D_N]_{k,l} = \frac{1}{\sqrt{N}} e^{\frac{j2\pi kl}{N}}.$$

Further, $$R_N(q) = \text{diag}\left(\begin{bmatrix} e^{j2\pi \cdot 0 \cdot \frac{q}{N}} & e^{j2\pi \cdot 1 \cdot \frac{q}{N}} & \cdots & e^{j2\pi \cdot (N-1) \cdot \frac{q}{N}} \end{bmatrix}\right)$$

to be a size N×N rotation matrix, defined for $0 \leq q < 1$. Multiplying $D_N$ with $R_N(q)$ from the left creates a rotated DFT matrix with entries $$[R_N(q)D_N]_{k,l} = \frac{1}{\sqrt{N}} e^{\frac{j2\pi k(l+q)}{N}}.$$

The rotated DFT matrix $R_N(q)D_N = [d_1 \ d_2 \ \ldots \ d_N]$ consists of normalized orthogonal column vectors $\{d_i\}_{i=1}^N$ which furthermore span the vector space $\mathbb{C}^N$. That is, the columns of $R_N(q)D_N$, for any q, is an orthonormal basis of $\mathbb{C}^N$.

The MRT precoder is multiplied with the rotated DFT matrix in order to do a basis change from, so called, antenna space to beam space. The resulting beam space representation of the precoder vector may then be expressed as $w_B^T =$ $$w_{MRT}^H R_N(q) D_N = h^T R_N(q) D_N = h^T [d_1 \ d_2 \ \ldots \ d_N] = \left[ \sum_{i=1}^M \tilde{c}_i a^T(\theta_i) d_1 \quad \sum_{i=1}^M \tilde{c}_i a^T(\theta_i) d_2 \quad \ldots \quad \sum_{i=1}^M \tilde{c}_i a^T(\theta_i) d_N \right].$$

Note first that the steering vector $$a(\theta) = \begin{bmatrix} 1 \\ e^{j2\pi \cdot 1 \cdot d_\lambda \cos(\theta)} \\ \vdots \\ e^{j2\pi \cdot (N-1) \cdot d_\lambda \cos(\theta)} \end{bmatrix}$$

may be expressed as scaled column of a rotated DFT matrix $[R_N(q)D_N]_{:,l}$ with $l = [d_\lambda \cos(\theta)]$ and $q = d_\lambda \cos(\theta) - [d_\lambda \cos(\theta)]$. Note that a conjugated steering vector $a^*(\theta)$ is equal to another steering vector with the angle mirrored at the broadside of the array, i.e., $a^*(\theta) = a(\pi - \theta)$.

Now moving back to the beam space representation of the precoder vector $w_B^T$, note that $a^T(\theta_i)d_l$ is the inner product between a conjugated steering vector and a column of a rotated DFT matrix. It was previously noted that any steering vector could be expressed as a scaled column of a rotated DFT matrix (with appropriate values set for $q = q_0$ and $l = l_0$). In that case, the inner product between the (conjugated) steering vector and $d_l$ will be $$a^T(\theta_i)d_l = \begin{cases} \sqrt{N}, & l = l_0 \\ 0, & l \neq l_0 \end{cases}.$$

Figure 4A:
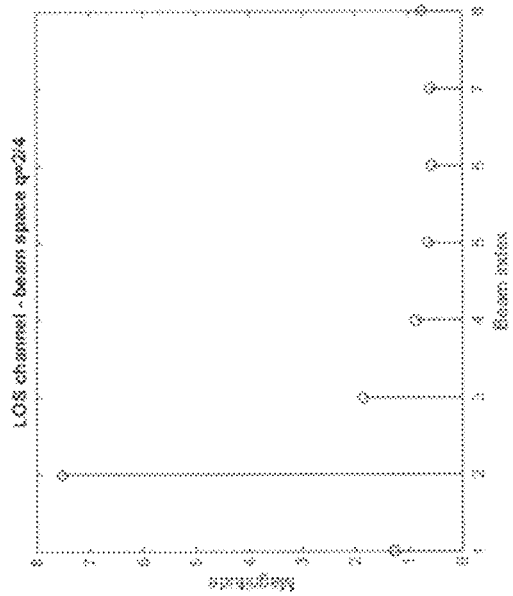
FIG. 4A-4D are graphs of an angular spread of a channel for four different beam space rotation factors.
Figure 4B:
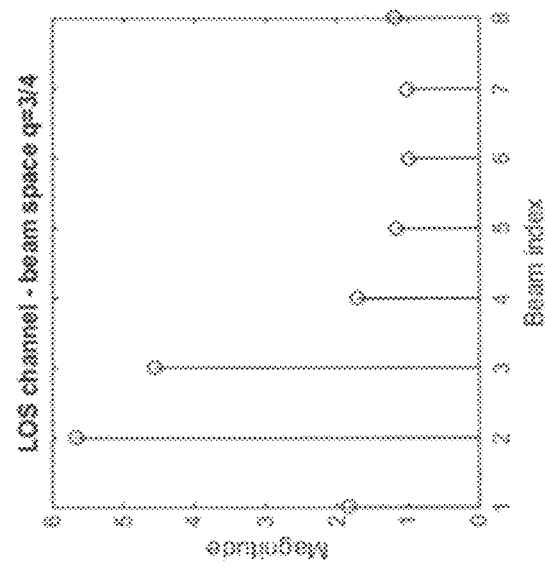
Figure 4C:
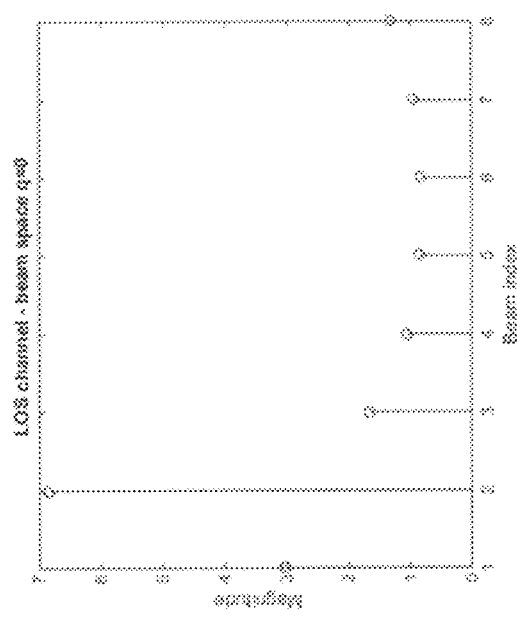
Figure 4D:
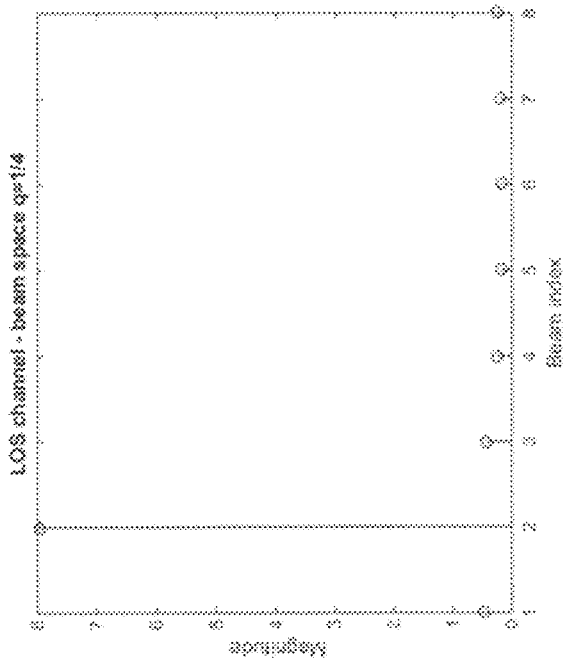

Again, this requires that q is set appropriately so that the beam space is rotated to fit the steering vector of multi-path coefficient i perfectly. If that is not the case, the steering vector will still be sparse in the beam space coordinate system, with one or two coefficients having a large magnitude and the rest of the coefficients having a low magnitude. Each multi-path component will thus, to a large extent, only contribute to one or a few beam space coefficients. The impact of beam space rotation on the sparseness of the beam space channel is illustrated in FIGS. 4A-4D, in which a Line-of-Sight (LoS) channel is shown. FIG. 4A is for a rotation index/factor of q=0. FIG. 4B is for a rotation index/factor of q=⅔. FIG. 4C is for a rotation index/factor of q=¼. FIG. 4D is for a rotation index/factor of q=¾.

However, the frequency-domain channel is a sum of M multi-path components each with a possibly different angle of departure $\theta_i$. The beam space sparseness of the channel is thus dependent on the distribution of the multi-path components AoD $\theta_i$. The spread in this distribution is often denoted as the angular spread of a channel. A pure Line-of-Sight (LoS) channel has low angular spread and can be very sparsely represented in beam space, as is illustrated in FIGS. 4A-4D. A channel with very large angular spread, on the other hand, cannot be sparsely represented in beam space, but will need to be represented by many beam space coefficients. However, a cellular wireless channel typically has only a few strong enough multi-path components, and can thus be effectively represented with only a few beam space coefficients. This is what is exploited by the multi-beam codebooks presented herein.

To elucidate the precoder structure of some embodiments, the (rotated) DFT matrices that were appropriate transforms for a single-polarized ULA are extended to also fit the more general case of dual-polarized 2D uniform planar arrays (UPAS).

A rotated 2D DFT matrix is defined as $D_{N_V,N_H}(q_V, q_H) = (R_{N_H}(q_H)D_{N_H}) \otimes (R_{N_V}(q_V)D_{N_V}) = [d_1 \ d_2 \ \ldots \ d_{N_V N_H}]$. The columns $\{d_i\}_{i=1}^{N_{DP}}$ of $D_{N_V,N_H}(q_V, q_H)$ constitutes an orthonormal basis of the vector space $\mathbb{C}^{N_V N_H}$. Such a column $d_i$ is henceforth denoted a (DFT) beam.

Consider now a dual-polarized UPA, where the channel matrix $H = [H_{pol1} \ H_{pol2}]$.

Create a dual-polarized beam space transformation matrix $$B_{N_V,N_H}(q_V, q_H) = I_2 \otimes D_{N_V,N_H}(q_V, q_H) = \begin{bmatrix} D_{N_V,N_H}(q_V, q_H) & 0 \\ 0 & D_{N_V,N_H}(q_V, q_H) \end{bmatrix} = \begin{bmatrix} d_1 & d_2 & \cdots & d_{N_V N_H} & 0 & 0 & \cdots & 0 \\ 0 & 0 & \cdots & 0 & d_1 & d_2 & \cdots & d_{N_V N_H} \end{bmatrix} = [b_1 \ b_2 \ \cdots \ b_{2N_V N_H}].$$

The columns $\{b_i\}_{i=1}^{2N_V N_H}$ of $B_{N_V,N_H}(q_V, q_H)$ constitutes an orthonormal basis of the vector space $\mathbb{C}^{2N_V N_H}$. Such a column $b_i$ is henceforth denoted a single-polarized beam (SP-beam) as it is constructed by a beam d transmitted on a single polarization $$\left(i.e., b = \begin{bmatrix} d \\ 0 \end{bmatrix} \text{ or } b = \begin{bmatrix} 0 \\ d \end{bmatrix}\right).$$

Also introduced is the notation "dual-polarized beam" to refer to a beam transmitted on both polarizations (co-phased with an (arbitrary) co-phasing factor $e^{j\alpha}$, i.e., $$b_{DP} = \begin{bmatrix} d \\ e^{j\alpha}d \end{bmatrix}.$$

It should be noted that the co-phasing factors can be used to make the transmitted beams from the two polarizations within a layer (of a multi-layer transmission) add up coherently (i.e. in-phase) at the receiver in order to increase the received power of that layer, which in turn increases the received SINR of that layer. The co-phasing factors can also make the different layers (in case of a rank-2 transmission or higher) be received orthogonal towards one another in order to minimize inter-layer interference, which also leads to increase the received SINR of the layers.

Utilizing the assumption that the channel is somewhat sparse, much of the channel energy can be sufficiently captured by only selecting a column subset of $B_{N_V,N_H}$ ($q_V$, $q_H$). That is, it is sufficient to describe a couple of the SP-beams, which keeps down the feedback overhead. A column subset $I_S$ consisting of $N_{SP}$ columns of $B_{N_V,N_H}$ ($q_V$, $q_H$) is selected to create a reduced beam space transformation matrix $B_{I_S} = [b_{I_S(1)} \ b_{I_S(2)} \ldots b_{I_S(N_{SP})}]$. In other words, select columns number $I_S$=[15 1025] to create the reduced beam space transformation matrix $B_{I_S} = [b_1 \ b_5 \ b_{10} \ b_{25}]$, as one non-limiting example.

Furthermore, it should be noted that a precoder matrix w may be derived from eigenvalues of the channel matrix H. More specifically, the precoder w may be calculated to be approximately equal to the principal eigenvectors of the channel matrix H. For example, in the case of a single receive antenna, which can thus support only a single layer transmission, the strongest eigenvector (v1) is equal to the MRT precoder, i.e. $w_{MRT} = h^* = v1$.

A general precoder structure for precoding a single layer is as follows:

$$w = B_{I_S} \begin{bmatrix} c_1 \\ c_2 \\ \vdots \\ c_{N_{SP}} \end{bmatrix} = [b_{I_S(1)} \ b_{I_S(2)} \ \ldots \ b_{I_S(N_{SP})}] \begin{bmatrix} c_1 \\ c_2 \\ \vdots \\ c_{N_{SP}} \end{bmatrix} = \sum_{i=1}^{N_{SP}} c_i b_{I_S(i)}.$$

where $\{c_i\}_{i=1}^{N_{SP}}$ are complex coefficients. A more refined multi-beam precoder structure is achieved by separating the complex coefficients in a power (or amplitude) and a phase part as $$w = \begin{bmatrix} c_1 \\ c_2 \\ \vdots \\ c_{N_{SP}} \end{bmatrix} = B_{I_S} \begin{bmatrix} \sqrt{p_1} e^{j\alpha_1} \\ \sqrt{p_2} e^{j\alpha_2} \\ \vdots \\ \sqrt{p_{N_{SP}}} e^{j\alpha_{N_{SP}}} \end{bmatrix} = \quad \text{equation 4}$$

$$B_{I_S} \begin{bmatrix} \sqrt{p_1} & 0 & \cdots \\ 0 & \sqrt{p_2} & & \\ & & \ddots & 0 \\ \cdots & & 0 & \sqrt{p_{N_{SP}}} \end{bmatrix} \begin{bmatrix} e^{j\alpha_1} \\ e^{j\alpha_2} \\ \vdots \\ e^{j\alpha_{N_{SP}}} \end{bmatrix} =$$

$$B_{I_S} \sqrt{P} \begin{bmatrix} e^{j\alpha_1} \\ e^{j\alpha_2} \\ \vdots \\ e^{j\alpha_{N_{SP}}} \end{bmatrix}$$

As multiplying the precoder vector w with a complex constant C does not change its beamforming properties (as only the phase and amplitude relative to the other single-polarized beams is of importance), one may without loss of generality assume that the coefficients corresponding, to e.g., SP-beam1, is fixed to $p_1=1$ and $e^{j\alpha_1}=1$, so that parameters for one less beam may be signaled from the wireless device to the base station. Furthermore, the precoder may be further assumed to be multiplied with a normalization factor, so that a sum power constraint is fulfilled, i.e., that $\|w\|^2=1$. Any such normalization factor is omitted from the equations herein for clarity.

Once the wireless device has determined the precoder matrix, the following information should be fed back by the wireless device to the base station, e.g., eNodeB, in a CSI feedback report, for example:

the chosen columns of $B_{N_V,N_H}$ ($q_V$, $q_H$), i.e., the $N_{SP}$ single-polarized beams. This requires at most $N_{SP} \cdot \log_2 2N_V N_H$ bits;

The vertical and horizontal DFT basis rotation factors $q_V$ and $q_H$. For instance, the $$q(i) = \frac{i}{Q},$$

i=0,1, ..., Q–1, for some value of Q. The corresponding overhead would then be $2 \cdot \log_2 Q$ bits;

The (relative) power levels $\{p_2, p_3, \ldots, p_{N_{SP}}\}$ of the SP-beams. If L is the number of possible discrete power levels, $(N_{SP}-1) \cdot \log_2 L$ is needed to feed back the SP-beam power levels; and The co-phasing factors $$\{e^{j\alpha_2}, e^{j\alpha_3}, \ldots, e^{j\alpha_{N_{SP}}}\}$$

of the SP-beams. For instance, $$\alpha(k) = \frac{2\pi k}{K},$$

k=0,1, ... K–1, for some value of K. The corresponding overhead would be $(N_{SP}-1) \cdot \log_2 K$.

In the following examples, further optimizations can be performed in order to decrease the CSI feedback overhead.

In some embodiments, the possible choices of columns of $B_{N_V,N_H}$ ($q_V$, $q_H$) are restricted so that if column $i=i_0$ is chosen, so is column $i=i_0+N_V N_H$. That is, if an SP-beam corresponding to a certain beam mapped to the first polarization is chosen, e.g., $$b_{i_0} = \begin{bmatrix} d_{i_0} \\ 0 \end{bmatrix},$$

this would imply that the SP-beam $$b_{i_0+N_V N_H} = \begin{bmatrix} 0 \\ d_{i_0} \end{bmatrix}$$

is chosen as well. That is, the SP-beam corresponding to the said certain beam mapped to the second polarization is chosen as well. This would reduce the feedback overhead as only $N_{DP}=N_{SP}/2$ columns of $B_{N_V,N_H}(q_V, q_H)$ would have to be selected and signaled back to the base station. In other words, the column selection is done on a beam (or DP-beam) level rather than an SP-beam level. If a certain beam is strong on one of the polarizations it would typically imply that the beam would be strong on the other polarization as well, at least in a wideband sense, so the loss of restricting the column selection in this way would not significantly decrease the performance.

In one embodiment, the beams are sorted in power strength. The quantization of relative powers may then be coarser for beams with weak power to save feedback bits. In another embodiment, only the index of the strongest beam is pointed out, the other beams are given in an order that does not depend on the power strength. Specifying the beams in an unordered fashion may save feedback bits.

In some embodiments, the multi-beam precoder is factorized into two or more factors that are selected with different frequency-granularity, in order to reduce the feedback overhead. In a preferred such embodiment, the SP-beam selection (i.e., the choice of matrix $B_{I_S}$) and the relative SP-beam powers/amplitudes (i.e., the choice of matrix $\sqrt{P}$) is selected with a certain frequency-granularity while the SP-beam phases (i.e., the choice of matrix $$\left( \text{i.e., the choice of matrix } \begin{bmatrix} e^{j\alpha_1} \\ e^{j\alpha_2} \\ \vdots \\ e^{j\alpha_{N_{SP}}} \end{bmatrix} \right)$$

is selected with another certain frequency-granularity. In one such embodiment, the said certain frequency-granularity corresponds to a wideband selection (that is, one selection for the entire bandwidth of the carrier) while the said another certain frequency-granularity corresponds to a per-subband selection (that is, the carrier bandwidth is split into a number of subbands, typically consisting of 1-10 physical resource blocks (PRBs), and a separate selection is done for each subband).

In a typical such embodiment, the multi-beam precoder vector is factorized as $w=W_1 W_2$, where $W_1$ is a first factor and can be selected (or generated) with a certain frequency-granularity and $W_2$ is a second factor and can be selected (or generated) with another certain frequency-granularity. The precoder vector may then be expressed as $$w = \underbrace{B_{I_S} \sqrt{P}}_{=W_1} \underbrace{\begin{bmatrix} e^{j\alpha_1} \\ e^{j\alpha_2} \\ \vdots \\ e^{j\alpha_{N_{SP}}} \end{bmatrix}}_{=W_2} = W_1 W_2.$$

Using this notation, if the said certain frequency-granularity corresponds to a wideband selection of $W_1$ and the said another certain frequency-granularity corresponds to a per-subband selection of $W_2$, the precoder vector for subband $l$ may be expressed as $w_l = W_1 W_2(l)$. That is, only $W_2$ is a function of the subband index $l$.

In a more general version of the previous sets of embodiments, the criterion that the multi-beam precoder vector $w$ is composed of two or more matrix factors are dropped. Instead, the choice of $w$ may be expressed as a selection of two or more precoder indices, i.e., $i_1, i_2, \ldots$, where the precoder indices may be selected with different frequency-granularity. That is, the precoder vector may be expressed as a function of the two or more precoder indices $i_1, i_2, \ldots$, so that $w(i_1, i_2, \ldots)$. In a preferred embodiment, $i_1$ may be selected on a wideband basis while $i_2$ may be selected on a per-subband basis so that the precoder vector for subband $l$ may be expressed as $w_l = w(i_1, i_2(l))$.

The previous embodiments have been presented assuming a precoder vector $w$ for single-layer transmission (i.e., transmission rank one) but are applicable for multi-layer transmission (i.e., transmission rank larger than one) using a precoder matrix $W$ as well. The following embodiments further concern precoder matrix designs for multi-layer transmission.

In some embodiments, the precoder matrix is constructed by keeping the SP-beam selection and the relative SP-beam powers/amplitudes the same for all layers of the multi-layer transmission and only changing the SP-beam phases for the different layers. That is, the multi-beam precoder matrix for multi-layer transmission may be expressed as $$W = B_{I_S} \sqrt{P} \begin{bmatrix} e^{j\alpha_{1,1}} & e^{j\alpha_{1,2}} & \ldots & e^{j\alpha_{1,R}} \\ e^{j\alpha_{2,1}} & e^{j\alpha_{2,2}} & \ldots & e^{j\alpha_{2,R}} \\ & & \vdots & \\ e^{j\alpha_{N_{SP},1}} & e^{j\alpha_{N_{SP},2}} & \ldots & e^{j\alpha_{N_{SP},R}} \end{bmatrix},$$

where R is the number of layers in the multi-layer transmission, i.e., the transmission rank.

In another embodiment, some of the entries in the phase matrix $$\begin{bmatrix} e^{j\alpha_{1,1}} & e^{j\alpha_{1,2}} & \ldots & e^{j\alpha_{1,R}} \\ e^{j\alpha_{2,1}} & e^{j\alpha_{2,2}} & \ldots & e^{j\alpha_{2,R}} \\ & & \vdots & \\ e^{j\alpha_{N_{SP},1}} & e^{j\alpha_{N_{SP},2}} & \ldots & e^{j\alpha_{N_{SP},R}} \end{bmatrix}$$

are allowed to be zero, so as to not use all of the selected SP-beams to transmit all of the layers.

Note that the previous embodiments regarding multi-layer transmission may be combined with the embodiments regarding different frequency-granularities of precoder factors. For instance, $$W_1 = B_{l_S} \sqrt{P} \text{ and}$$

$$W_2 = \begin{bmatrix} e^{j\alpha_{1,1}} & e^{j\alpha_{1,2}} & \ldots & e^{j\alpha_{1,R}} \\ e^{j\alpha_{2,1}} & e^{j\alpha_{2,2}} & \ldots & e^{j\alpha_{2,R}} \\ & & \vdots & \\ e^{j\alpha_{N_{SP},1}} & e^{j\alpha_{N_{SP},2}} & \ldots & e^{j\alpha_{N_{SP},R}} \end{bmatrix}$$

so that the first matrix factor (or first factor) $W_1$ is common between all layers of the multi-layer transmission while the second matrix factor (or second factor) $W_2$ contains the layer-specific precoding.

In some embodiments, the precoder structure for a rank-2 precoder is considered and it is assumed that the selection of columns of $B_{N_V,N_H}(q_V, q_H)$ is done on a DP-beam basis rather than an SP-beam basis, as disclosed in an earlier embodiment. In these embodiments, the phase selection for the precoder for the second layer is a function of the phase selection for the precoder for the first layer. In one such embodiment, the phases for the second layer that corresponds to the first polarization is equal to the phases for the first layer that corresponds to the first polarization, while the phases for the second layer that corresponds to the second polarization is the negation of the phases for the first layer that corresponds to the second polarization. A negation corresponds to a phase shift of 180 degrees. Constructing the precoder in this fashion ensures that the two layers are orthogonal.

The following embodiments concern how the relative power levels $\{p_2, p_3, \ldots, p_{N_{SP}}\}$ of the SP-beams are quantized. It can be noted that the relative power levels may be larger than zero and smaller than one, since one may assume that the first selected SP-beam corresponds to the strongest SP-beam. In one embodiment, the beam powers are uniformly quantized between $[p_{min}, 1]$, where $p_{min}$ corresponds to a minimum power level (which may be equal to zero). In one embodiment, a monotonic function of the beam powers is uniformly quantized. In one such embodiment, the square root of the beams power (i.e., $\sqrt{p_i}$) is uniformly quantized.

In another such embodiment, the quantization is done in the dB-domain so that the values $10 \log_{10} p_i$ are uniformly quantized in the interval $[p_{min,dB}, 0]$ dB instead. Note here that $p_{min,dB} < 0$ and The following embodiments concern how such feedback as described herein may be calculated by the wireless device, i.e., they are wireless device implementation embodiments.

In these embodiments, the wireless device selects the phases $$\{e^{j\alpha_2}, e^{j\alpha_3}, \ldots, e^{j\alpha_{N_{SP}}}\}$$

of the SP-beams, where each phase may be selected from a set of possible values, for instance, $$\alpha(k) = \frac{2\pi k}{K},$$

k=0,1, ... K-1, for some value of K. There are thus $K^{N_{SP}-1}$ possible combinations, which may be very large if K or $N_{SP}$ is large and it may thus be infeasible for the wireless device to do an exhaustive search of all possibilities. Instead, the wireless device may perform sequential co-phasing. That is, the wireless device first searches through the K possibilities for the first co-phasing factor $e^{j\alpha_2}$ (by e.g., calculating the received power of the precoder hypothesis) while setting all remaining $N_{SP}-2$ co-phasing factors to zero. It then searches through the K possibilities for the second co-phasing factor $e^{j\alpha_3}$ while setting the remaining $N_{SP}-3$ co-phasing factors to zero, and so forth. Instead of searching through all the $K^{N_{SP}-1}$ possible combination, the wireless device only has to search through $K \cdot (N_{SP}-1)$ hypotheses.

The wireless device may also select which SP-beams should be included in the precoder, i.e., how to select columns from the dual-polarized beam space transformation matrix $B_{N_V,N_H}$ to form the reduced beam space transformation matrix $B_{l_S}$. First, the wireless device may form an averaged channel correlation matrix by averaging in frequency corresponding to the frequency-granularity of the beam selection (e.g., over the entire bandwidth) as $R = \Sigma_f H^H H$. Then, it may calculate the wideband received power of each SP-beam by taking the diagonal elements of the matrix product $B_{H_V,N_H}^H R B_{N_V,N_H}$. The wireless device may then select the $N_{SP}$ beams which have the largest wideband received power. The received power of a (hypothetical) beam i is given by: $\|Hb_i\|^2$. The relative power levels p of the (hypothetical) beams in the precoder can be set to correspond to the relative received powers of the beams, i.e.:

$$\frac{p_1}{p_2} = \frac{\|Hb_1\|^2}{\|Hb_2\|^2}.$$

One embodiment concerns how the rotation factors $q_V$ and $q_H$ may be calculated by the wireless device. It is assumed that the rotation factors may be selected from a fixed set of possible values, for instance, $$q(i) = \frac{i}{Q},$$

i=0,1, ..., Q-1, for some value of Q. The wireless device may then, for each possible value of the rotation factors ($q_V$, $q_H$), calculate the received power of the $N_{SP}$ strongest beams corresponding to the rotated beam space transformation matrix $B_{N_V,N_H}(q_V, q_H)$ according to the previous "beam selection method" embodiment. The wireless device may then select the rotation hypothesis that maximizes the received power in the reduced beam space.

It should be noted that in the selection of beams, the beams are not beams transmitted by the network node, but they are hypothesized transmissions that the wireless device evaluates. The network node/base station transmits a set of non-precoded CSI-RS (from e.g. each antenna element of the antenna array) which is measured by the wireless device, which can then be used to determine a channel estimate H. Based on this channel estimate, the wireless device will select an optimal precoder (which is comprised by a sum of orthogonal DFT beams). For example, to select the best beams, the wireless device will perform a search over the differently rotated orthogonal DFT bases/matrix $B_{N_V,N_H}(q_V, q_H)$ to:

1) select the best rotated orthogonal DFT basis/matrix $B_{N_V,N_H}(q_V, q_H)$ and the corresponding rotation factors $q_V, q_H$; and 2) select the best $N_{sp}$ beams from the basis/matrix $B_{N_V, N_H}$ ($q_V$, $q_H$).

Figure 5:
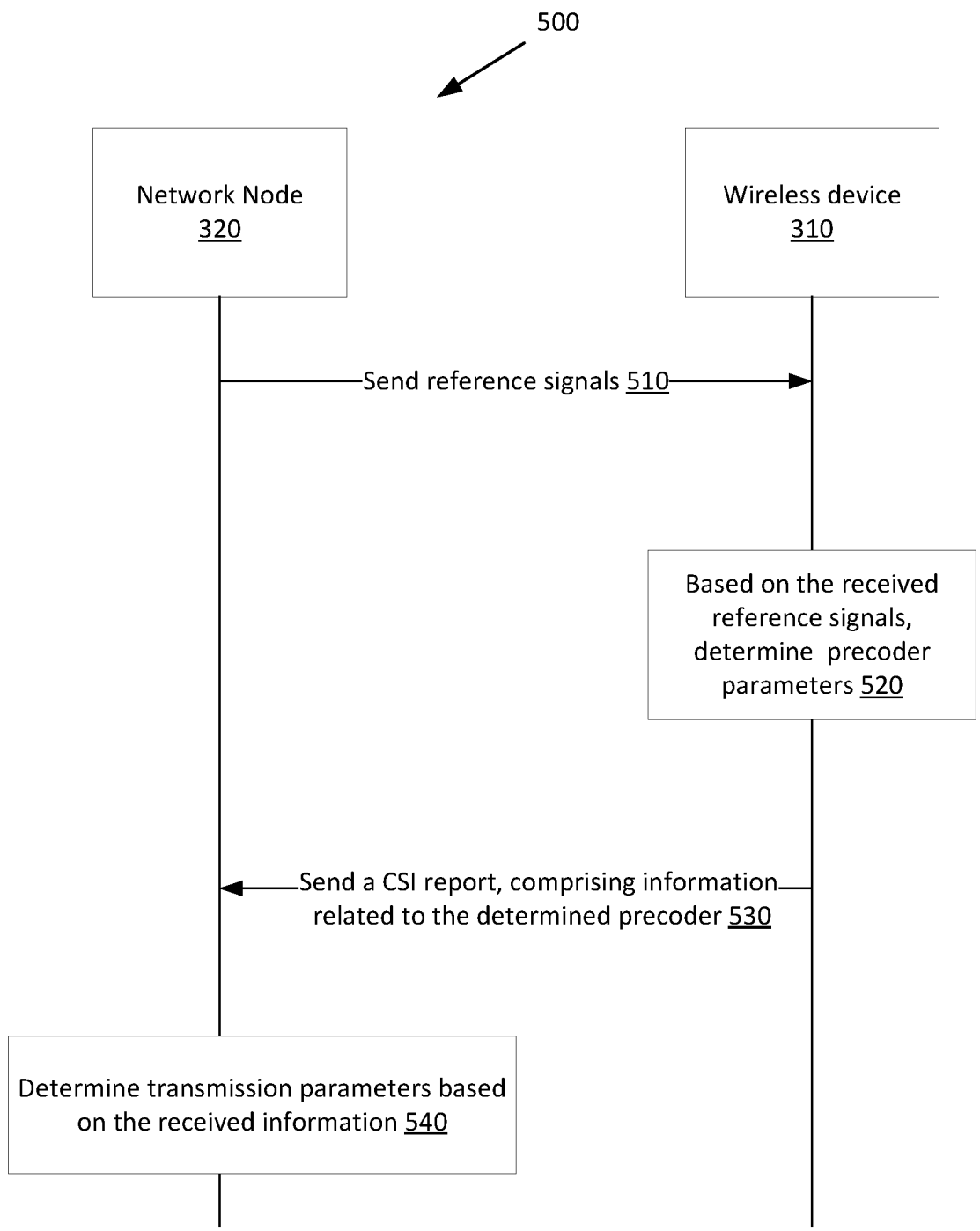
FIG. 5 is a signaling diagram between a wireless device and a network node for exchanging precoder information.

FIG. 5 illustrates a signaling diagram 500 between a network node 320, such as an eNB, and the wireless device 310, in a wireless communication network/system 300, for example, for reporting CSI feedback from the wireless device to the eNB.

The network node 320 first sends reference signals to the wireless device 310, such as the CSI-RS or CRS, or any other signals that allow to determine or provide information regarding the channel (step 510).

Based on the received reference signals, the wireless device 310 determines the parameters of a precoder (step 520). For example, the wireless device can determine an optimal precoder for the channel conditions/estimate based on the received reference signals.

Once the precoder parameters are determined, the wireless device 310 sends a CSI report to the network node, the CSI report including the determined precoder parameters (step 530).

Once the network node 320 receives the CSI report, it determines transmission parameters based on the received information (e.g. parameters of the precoder). For example, the network node 320 can decide to use the precoder recommended by the wireless device to determine a Modulation and Coding scheme (MCS) and use the precoding scheme of the precoder for the wireless device's data transmission. However, based on the received information, the network node 320 may decide to use another precoder and determine the MCS and precoding scheme based on this precoder (step 540).

It should be noted that the signaling diagram 500 is known in the art. Embodiments of the present disclosure are directed to how the wireless device 310 determines the parameters of a precoder to recommend to the network node 320. As an example, the wireless device 310 can select some beams, which have the largest received power, for example, from a plurality of orthogonal beams. To calculate the power level of the beams, the wireless device takes the diagonal elements of the matrix product $B_{H_V, N_H}{}^H R B_{N_V, N_H}$, where $R = \Sigma_f H^H H$ as described above. The wireless device also determines the phases of the selected beams. To determine the phases, the wireless device 310 may use the sequential co-phasing method, as described above. The wireless device may also calculate the rotation factors $q_V$ and $q_H$ which are used to obtain the orthogonal beams (d) and calculate the beam space transformation matrix $B_{N_V, N_H}$. Other methods for determining the power levels could be also used. For example, the wireless device could potentially do a full exhaustive search over all precoder hypotheses and calculate an estimate of the throughput achievable with each precoder.

Once the parameters of the precoder are determined, the wireless device sends the CSI report to the base station, the CSI report including the parameters of the precoder. According to some embodiments, the parameters of the precoder include the indices corresponding to the selected beams, their power levels and phases, and the rotation factors.

Figure 6:
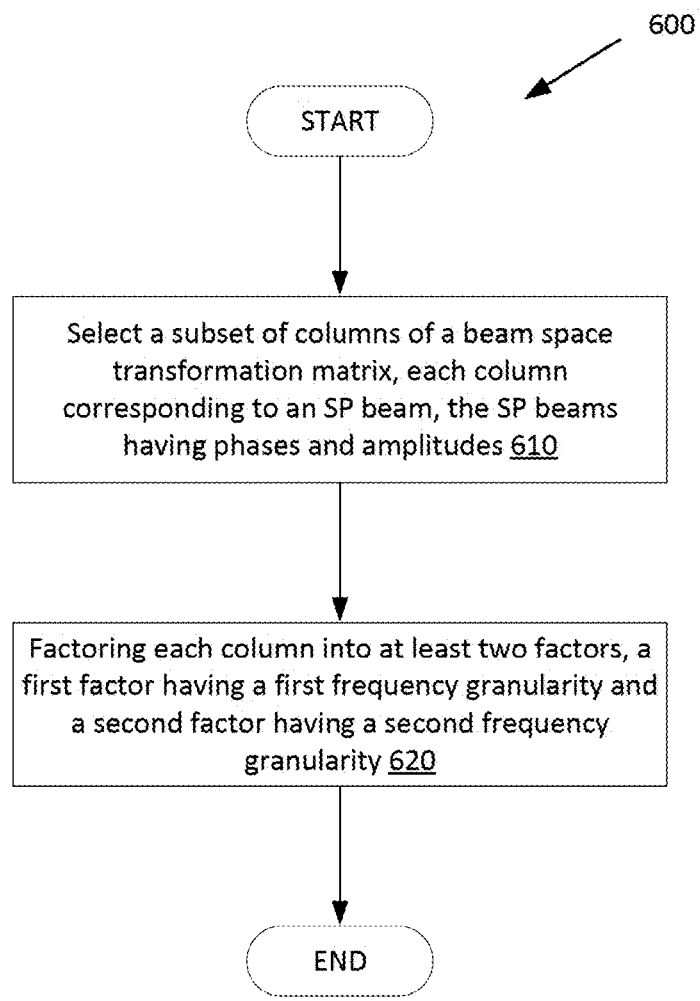
FIG. 6 is a flow chart of a method for determining precoder parameters for a wireless device, according to an embodiment.

In one embodiment, FIG. 6 is a flowchart of an exemplary process performed at a wireless device 310 for determining parameters to enable construction of a precoder codebook structure in a wireless communication system, according to an embodiment. The process includes selecting a subset of columns of a beam space transformation matrix, $B_{N_V, N_H}$ ($q_V, q_H$), each column corresponding to a single polarized beam (block 610). The process also includes factorizing each column into at least two factors, a first factor having a first frequency granularity and a second factor having a second frequency granularity (block 620).

Figure 7:
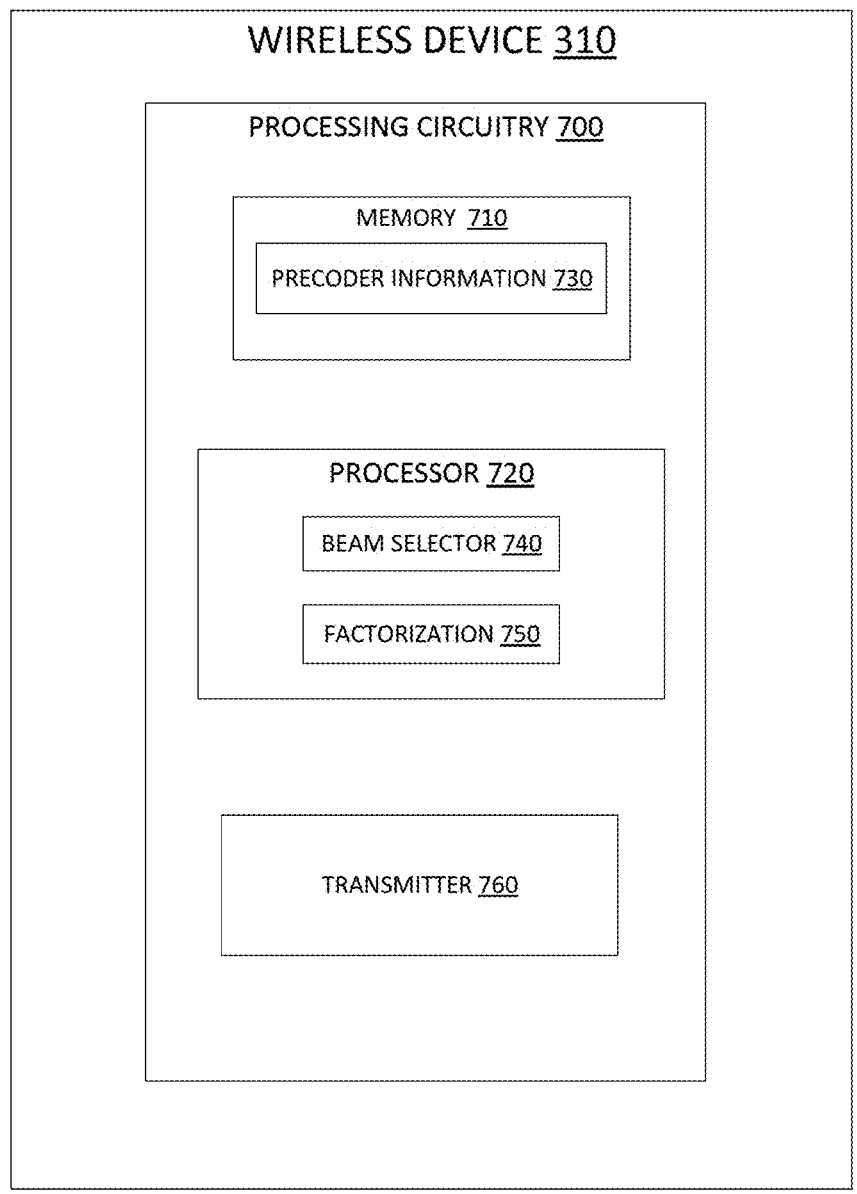
FIG. 7 is a block diagram of a wireless device configured to determine parameters of a precoder according to an embodiment.

FIG. 7 is a block diagram of an example wireless device 310 configured to determine precoder information to enable construction of a precoder codebook structure in a wireless communication system, according to an embodiment.

The wireless device 310 has processing circuitry 700. In some embodiments, the processing circuitry 700 may include a memory 710 and processor 720, the memory 710 containing instructions which, when executed by the processor 720, configure processor 720 to perform the one or more functions described herein, such as the steps of method 600. In addition to a traditional processor and memory, processing circuitry 700 may comprise integrated circuitry for processing and/or control, e.g., one or more processors and/or processor cores and/or FPGAs (Field Programmable Gate Array) and/or ASICs (Application Specific Integrated Circuitry).

The memory 710 is configured to store precoder information 730, the precoder information including frequency granularities of factors of single polarized beams. The processor is configured to select (740) a subset of columns of a beam space transformation matrix, each column corresponding to an SP beam, the SP beam having phases. The processor 720 also performs factorization (750) of each column into at least two factors, wherein a first factor has a first frequency granularity and a second factor has a second frequency granularity. The wireless device 310 further includes a transmitter 760 configured to transmit the factors and the frequency granularities to a base station.

Figure 8:
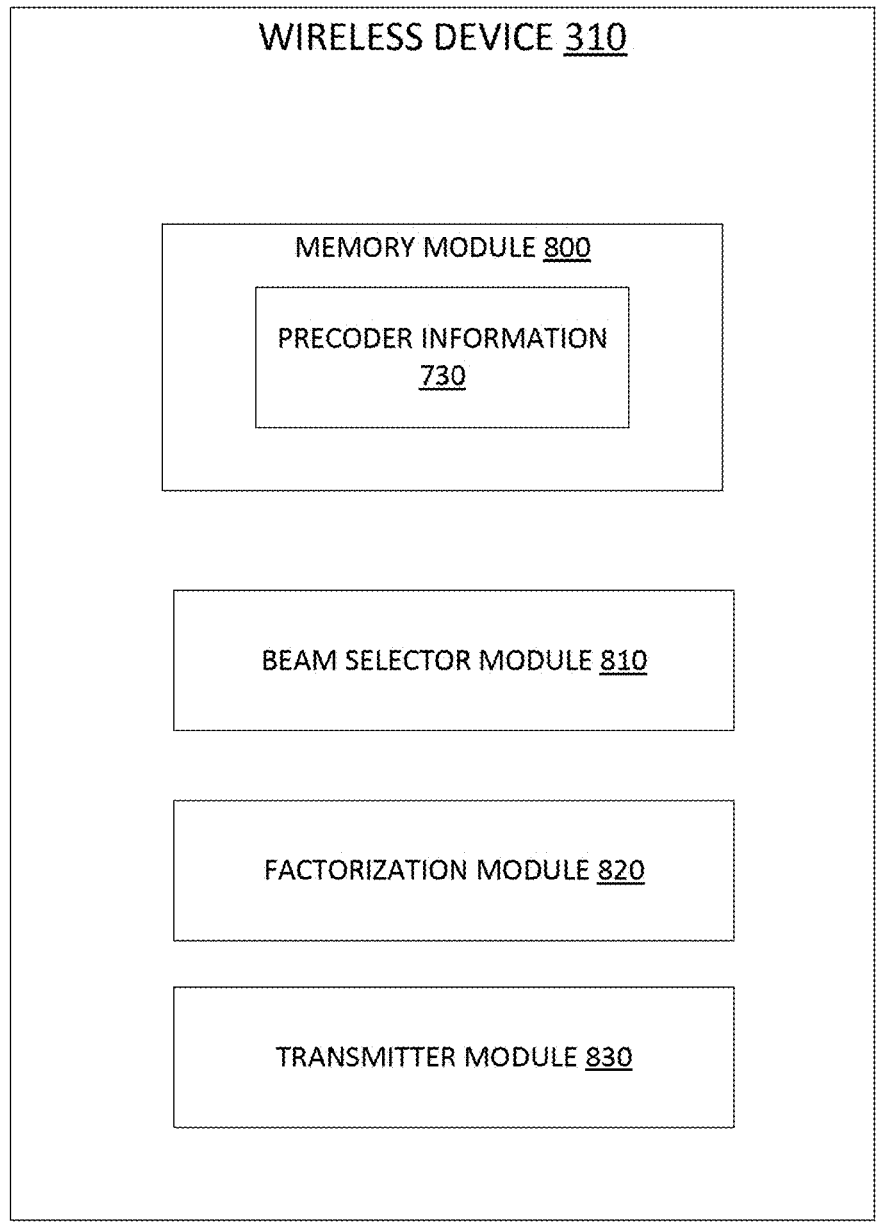
FIG. 8 is a block diagram of a wireless device configured to determine parameters of a precoder according to another embodiment.

FIG. 8 is a block diagram of an alternative embodiment of a wireless device 310 configured to determine parameters to enable construction of a precoder codebook structure in a wireless communication system, according to another embodiment. The wireless device 310 includes a memory module 800 (similar to 710 of FIG. 7) that stores precoder information 730. The wireless device also includes a beam selector module 810 configured to select a subset of columns of a beam space transformation matrix, each column corresponding to an SP beam, the SP beam having phases. The wireless device also includes factorization module 820 configured to factor each column into at least two factors, wherein a first factor has a first frequency granularity and a least a second factor has a second frequency granularity. The wireless device 310 further includes a transmitter module 830 configured to transmit the factors and the frequency granularities to a base station.

Figure 9:
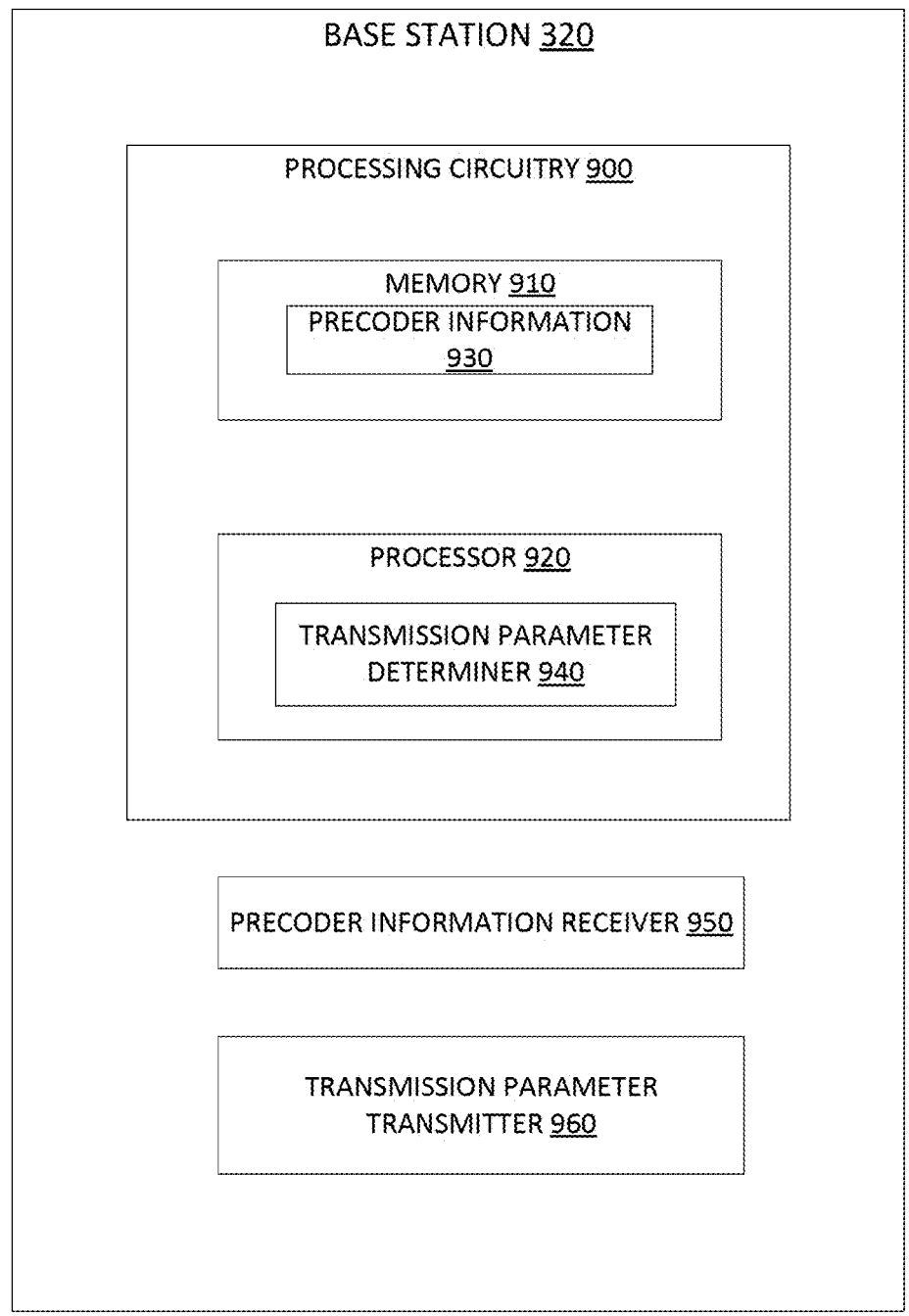
FIG. 9 is a block diagram of a network node, such as an eNodeB, configured to determine transmission parameters for a wireless device, according to an embodiment.

FIG. 9 is a block diagram of a base station 320, such as an eNodeB or network node, configured to transmit to a wireless device according to transmission parameters based on information received from the wireless device, according to an embodiment. The base station 320 has processing circuitry 900 having a memory 910 and a processor 920. The memory 910 is configured to store precoder information 930, contained in the CSI report received from the wireless device. The processor 920 is configured to determine transmission parameters 940 including a rank indicator, modulation and coding scheme. The base station 320 has a receiver 950 configured to receive, from the wireless device, precoder information including: a subset of columns of a beam space transformation matrix, each column corresponding to a signal polarized, SP, beam, the SP beams having phases and amplitudes, and frequency granularities of factors of the SP beams. The base station further comprises a transmitter 960 configured to transmit the transmission parameters to the wireless device.

Figure 10:
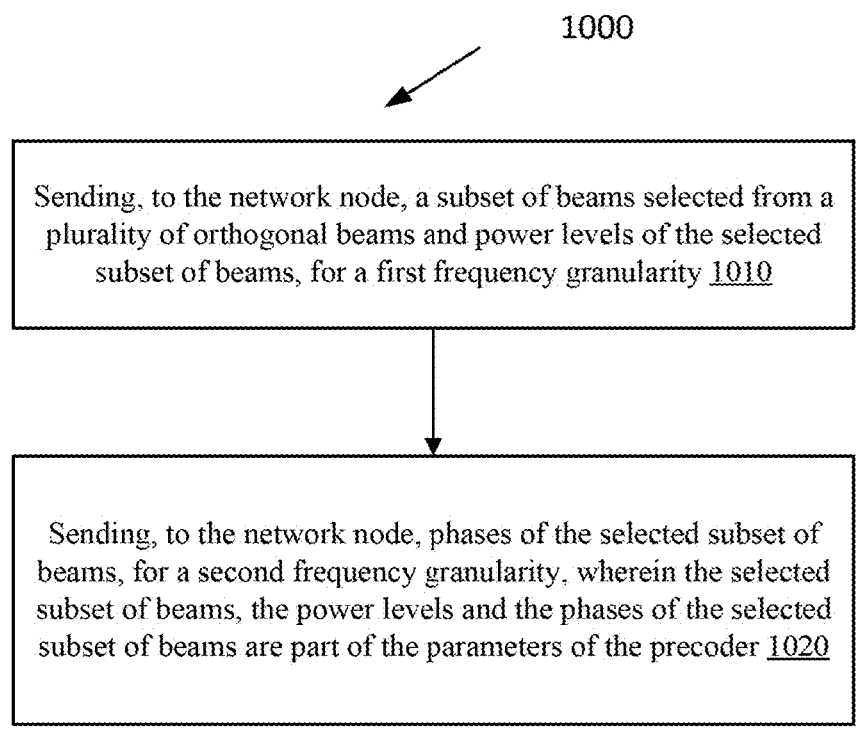
FIG. 10 is a flow chart of a method for sending precoder parameters in a wireless communication system, according to an embodiment.

FIG. 10 illustrates a flow chart of a method 1000 for sending parameters of a precoder by a wireless device to a network node, in a wireless communication system, such as 300.

The method starts with sending, to the network node, a subset of beams selected from a plurality of orthogonal beams and power levels of the selected subset of beams, for a first frequency granularity (block 1010).

The method then continues with sending, to the network node, phases of the selected subset of beams, for a second frequency granularity (block 1020), wherein the selected subset of beams, the power levels and the phases of the selected subset of beams are part of the parameters of the precoder. It should be noted that the parameters of the precoder sent to the network node 320 may also comprise the rotation factors and other information.

For example, the subset of beams is selected as explained above, to create the reduced space beam transformation matrix $B_{I_S}$. The plurality of orthogonal beams corresponds to the columns of $B_{N_V,N_H}(q_V, q_H)$, as an example. The first frequency granularity corresponds to the (entire) frequency bandwidth (of a carrier) and the second frequency granularity corresponds to a frequency subband within the frequency bandwidth. Also, the power levels are the same for all layers of a multi-layer transmission and the phases are specific to each individual layer of the multi-layer transmission, e.g. the phases are assignable independently for each individual layer.

It should be noted that the selected subset of beams, the power levels and the phases can be sent to the network node in one message or in several messages, as will be appreciated by a person skilled in the art.

Figure 11:
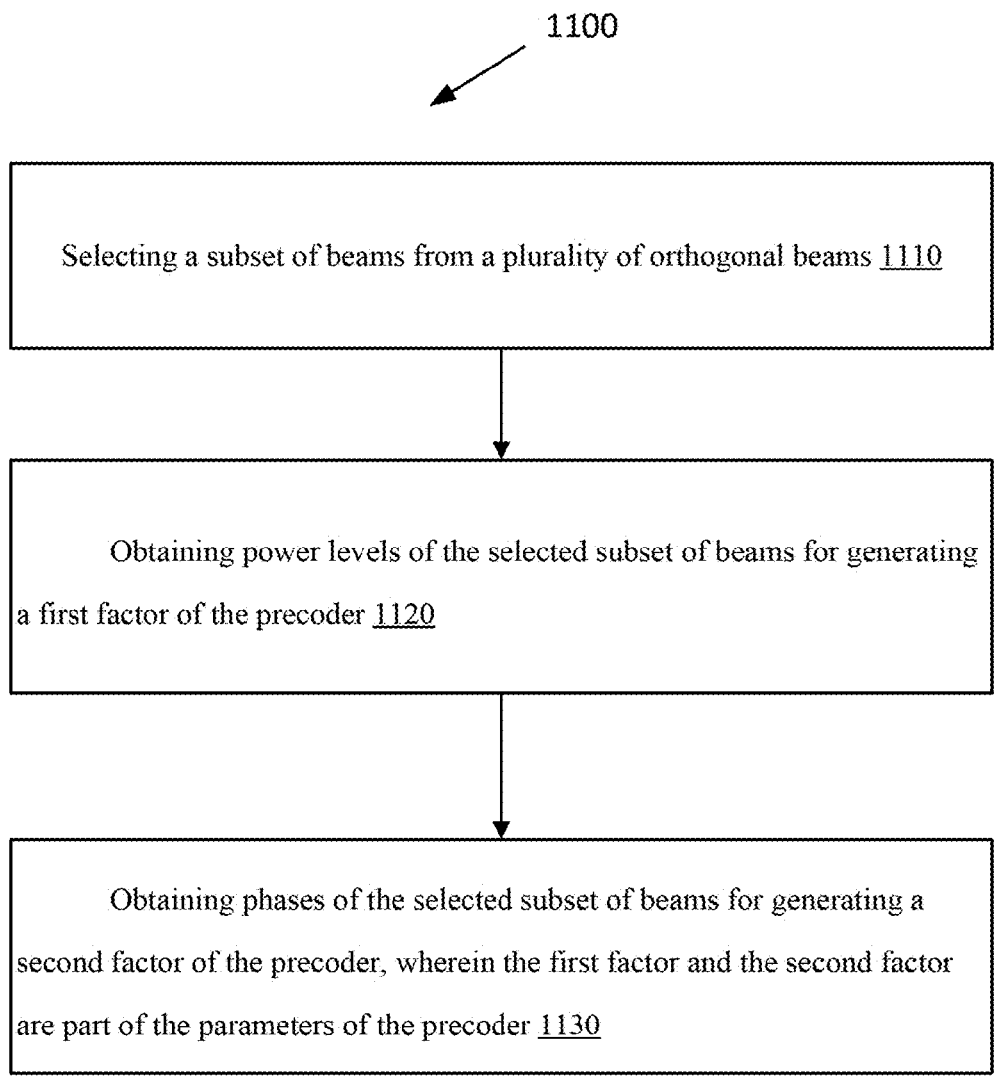
FIG. 11 is a flow chart of a method for determining precoder parameters in a wireless communication system, according to an embodiment.

FIG. 11 illustrates a flow chart of a method 1100 for determining parameters of a precoder in a wireless communication system, such as a Multi-User Multiple Input Multiple output (MU-MIMO) communication system, according to another embodiment. The method is performed by a wireless device, such as 310, for example. It should be noted that method 1100 is similar to method 600 of FIG. 6, with the factoring step 620 described in a different way.

Method 1100 starts with block 1110 by selecting a subset of beams from a plurality of orthogonal beams. The plurality of orthogonal beams can correspond to the columns of a rotated 2D DFT matrix, such as $B_{N_V,V_H}(q_V, q_H)$. The selected subset of beams can correspond to the columns of $B_{I_S}$, for example.

Method 1100 continues with obtaining power levels of the selected subset of beams for generating a first factor (block 1120). The power levels may be calculated by the wireless device 310 or through cloud computing, for example. The first factor corresponds to $W_1$, for example.

Then, method 1100 obtains phases of the selected subset of beams for generating a second factor, wherein the first factor and the second factor are part of the parameters of the precoder (block 1130). The phases may be calculated by the wireless device 310 or through cloud computing. The second factor corresponds to $W_2$. And the precoder w is given by: $w=W_1W_2$.

The parameters of the precoder are then sent to the network node 320 in a CSI feedback report, for example. It should be noted that the parameters of the precoder sent to the network node 320 may also comprise the rotation factors and other information.

In some embodiments, the selected subset of beams are single polarized beams, corresponding to transmission on a single polarization. In some other embodiments, the subset of beams is selected in polarization pairs, each polarization pair corresponding to a dual polarized (DP) beam.

In some embodiments, the selection of the subset of beams is done by determining beams which have the largest wideband received power.

When calculating the wideband received power, the wireless device 320 actually calculates the power coefficients or power levels. The power coefficients of the subset of beams can be expressed as a first matrix which corresponds to $W_1=B_{I_S}\sqrt{P}$. The power levels (or power coefficients or powers) are selected or obtained on a wideband basis (corresponding to the first frequency granularity), for example. Additionally, the power levels can be obtained to be the same (or common) to all layers of a multi-layer transmission, meaning that the beam power levels are shared between all layers and polarizations. The phases can be obtained to be specific to each layer of the multi-layer transmission, for example, meaning that the phases are assignable independently for each individual layer.

Furthermore, the selected subset of beams can be sorted in order of power levels or power strength. Also, a first beam that is of less strength than a second beam can be quantized with a coarser quantization than that of the second beam. As such, the number of bits can be saved when reporting the parameters of the precoder to the network node. It should be noted that the first beam having less strength than the second beam means that the power level of the first beam is inferior to the power level of the second beam.

In order to reduce the CSI feedback overhead, the powers of the selected beams can be quantized at a first quantization resolution and the phases of the selected beams can be quantized at a second quantization resolution. In order to further reduce the CSI feedback overhead, an index of a strongest beam (e.g. having the highest power level) of the selected subset of beams is specified and the rest of the beams in the selected subset is specified in an unordered fashion with regards to strength, in the report to the network node. Also, the power levels can be uniformly quantized between a first value and a second value, the first value being a minimum power level.

In some embodiments, the first factor is generated for a first frequency granularity, and the second factor is generated for a second frequency granularity, the first frequency granularity corresponding to an entire frequency bandwidth (of a carrier) and the second frequency granularity corresponding to a frequency subband within the frequency bandwidth.

In some embodiments, for a precoder of rank 2, the phases of the selected subset of beams for a first layer is a function of the phases of the selected subset of beams for a second layer.

It should be noted that the terms "power level", "power coefficient" and "amplitude" are interchangeably used in this disclosure to characterize the beams which comprise an amplitude/power level and a phase.

Figure 12:
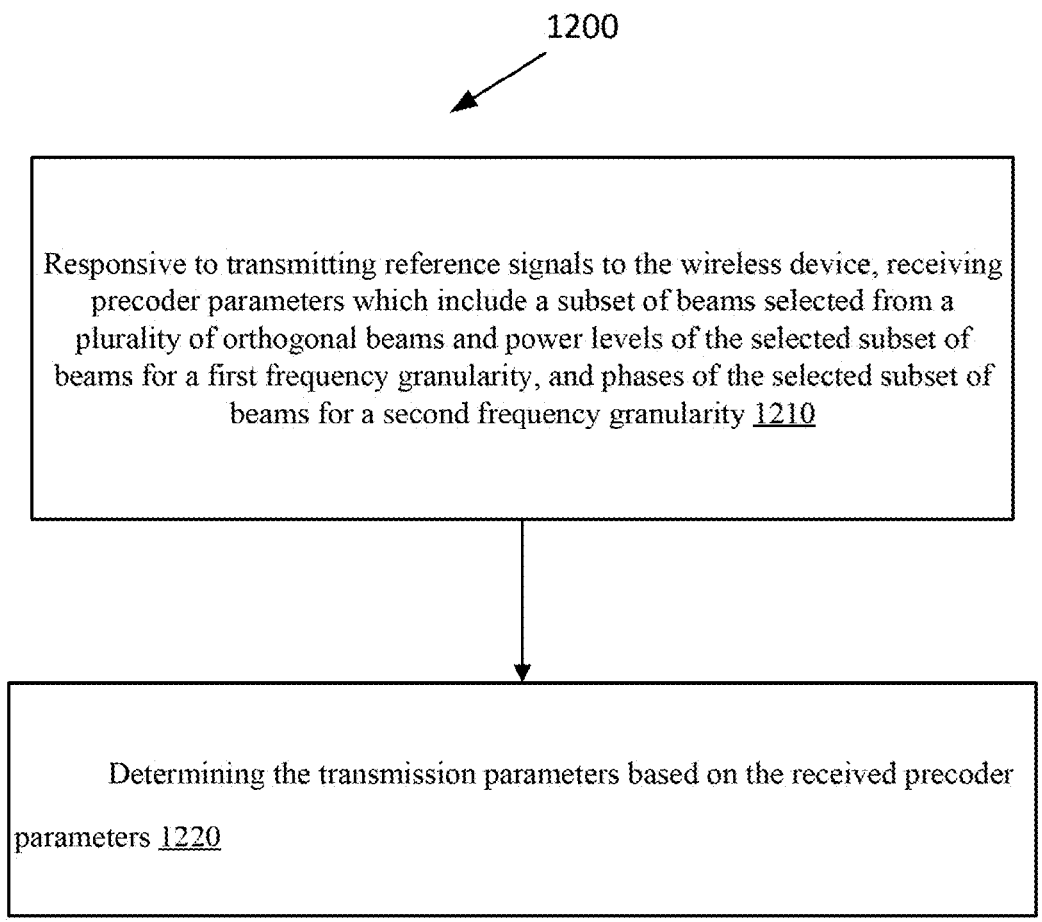
FIG. 12 is flow chart for determining transmission parameters in a wireless communication system, according to an embodiment.

FIG. 12 illustrates a flow chart of a method 1200 for determining transmission parameters in a wireless communication system, such as 300, according to an embodiment. The method is performed by a network node, such as 320, for example.

Method 1200 starts with block 1210 by, responsive to transmitting reference signals to the wireless device, receiving precoder parameters which include a subset of beams selected from a plurality of orthogonal beams and power levels of the selected subset of beams, for a first frequency granularity, and phases of the selected subset of beams for a second frequency granularity. The reference signals may comprise CSI-RS, RS, or any other signals that allow to determine a channel estimate.

Method 1200 continues with determining the transmission parameters based on the received precoder parameters (block 1220). For example, based on the received information, the network node determines the transmission parameters, such as a modulation coding scheme and a precoding scheme for the data transmission of the wireless device. Based on the received information, the network node can decide/choose to use the precoder suggested by the wireless device or it can decide/choose to use another precoder. The network node then sends the determined transmission parameters to the wireless device for data transmission.

Figure 13:
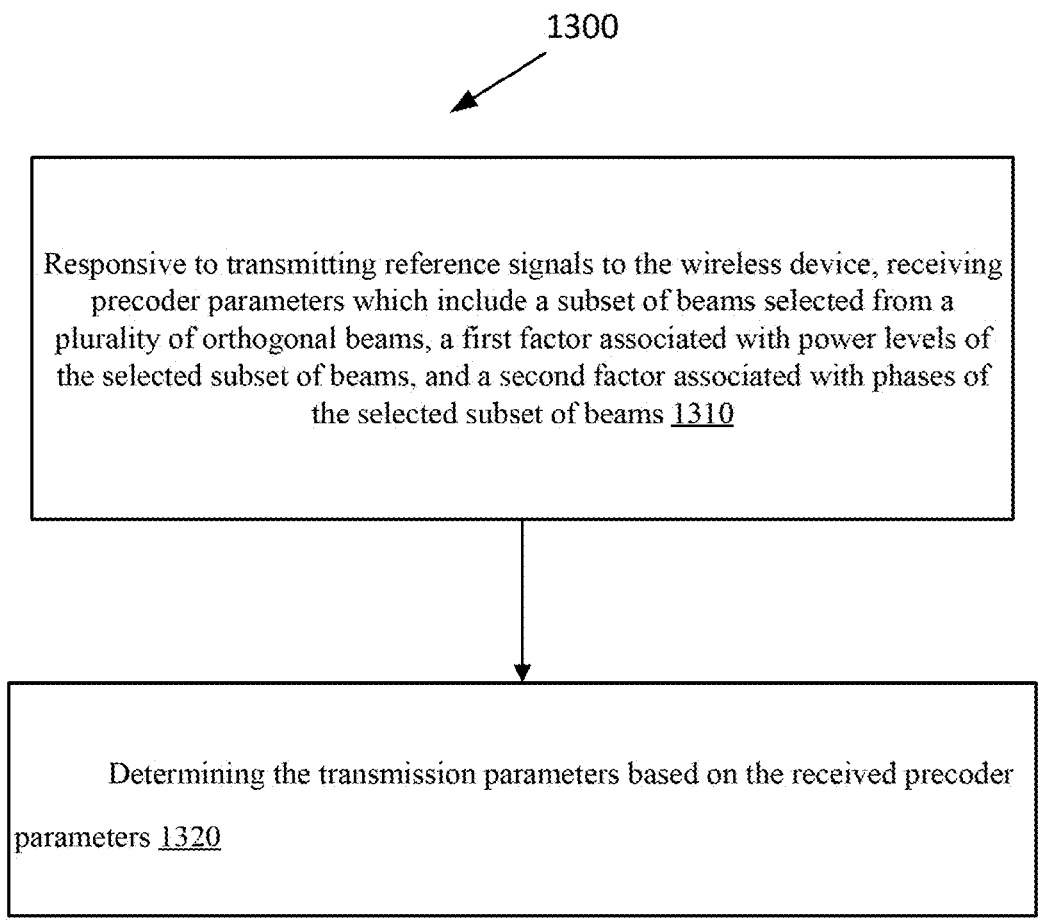
FIG. 13 is flow chart for determining transmission parameters in a wireless communication system, according to another embodiment.

FIG. 13 illustrates a flow chart of a method 1300 for determining transmission parameters in a wireless communication system, such as 300, according to another embodiment. The method is performed by a network node, such as 320, for example.

Method 1300 starts with block 1310 by, responsive to transmitting reference signals to the wireless device, receiving precoder parameters which include a subset of beams selected from a plurality of orthogonal beams, a first factor associated with power levels of the selected subset of beams, and a second factor associated with phases of the selected subset of beams. The reference signals may comprise CSI-RS, RS, or any other signals that allow to determine a channel estimate.

Method 1300 continues with determining the transmission parameters based on the received precoder parameters (block 1320). For example, based on the received information, the network node determines the transmission parameters, such as a modulation coding scheme and a precoding scheme for the data transmission of the wireless device. Based on the received information, the network node can decide/choose to use the precoder suggested by the wireless device or it can decide/choose to use another precoder. The network node then sends the determined transmission parameters to the wireless device for data transmission.

Figure 14:
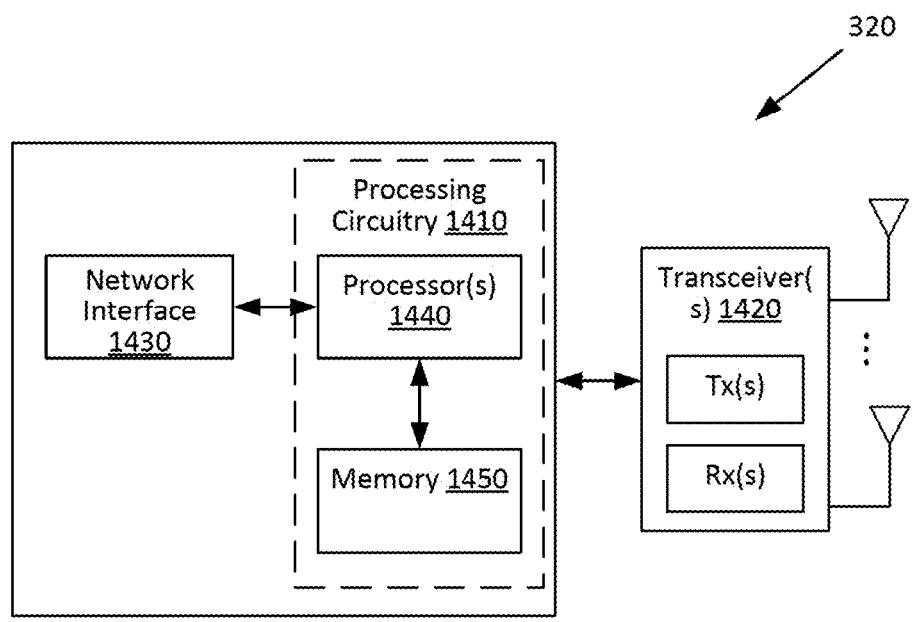
FIG. 14 is a block diagram of a network node configured to determine transmission parameters for a wireless device, according to another embodiment.

FIG. 14 is a block diagram of a base station 320, such as an eNodeB, configured to determine transmission parameters based on information received from the wireless device, according to some embodiments. The base station 320 has processing circuitry 1410 having a memory 1450 and a processor 1440. The base station 320 further comprises a network interface 1430 and one or more transceivers 1420. In some embodiments, the transceiver 1420 facilitates transmitting wireless signals to and receiving wireless signals from wireless device 310 (e.g., via an antenna), the one or more processors 1440 executes instructions to provide some or all of the functionalities described above as being provided by the network node 320, the memory 1450 stores the instructions for execution by the one or more processors 1440, and the network interface 1430 communicates signals to backend network components, such as a gateway, switch, router, Internet, Public Switched Telephone Network (PSTN), core network nodes or radio network controllers, etc. The network interface 1430 is connected to the processor and/or memory.

As an example, the processor 1440 is configured to perform methods 1200 and 1300. The one or more processors 1440 may include any suitable combination of hardware and software implemented in one or more modules to execute instructions and manipulate data to perform some or all of the described functions of the network node 320, such as those described in methods 1200 and 1300. In some embodiments, the one or more processors 1440 may include, for example, one or more computers, one or more central processing units (CPUs), one or more microprocessors, one or more applications, one or more application specific integrated circuits (ASICs), one or more field programmable gate arrays (FPGAs) and/or other logic. In certain embodiments, the one or more processors 1440 may comprise one or more of the modules discussed below with respect to FIG. 18. It should be noted that the processing circuitry 1410 is similar to processing circuitry 900. The processor 1440 is similar to processor 920 and the memory 1450 is similar to memory 910.

The memory 1450 is generally operable to store instructions, such as a computer program, software, an application including one or more of logic, rules, algorithms, code, tables, etc. and/or other instructions capable of being executed by one or more processors 1440. Examples of memory 1450 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

Figure 15:
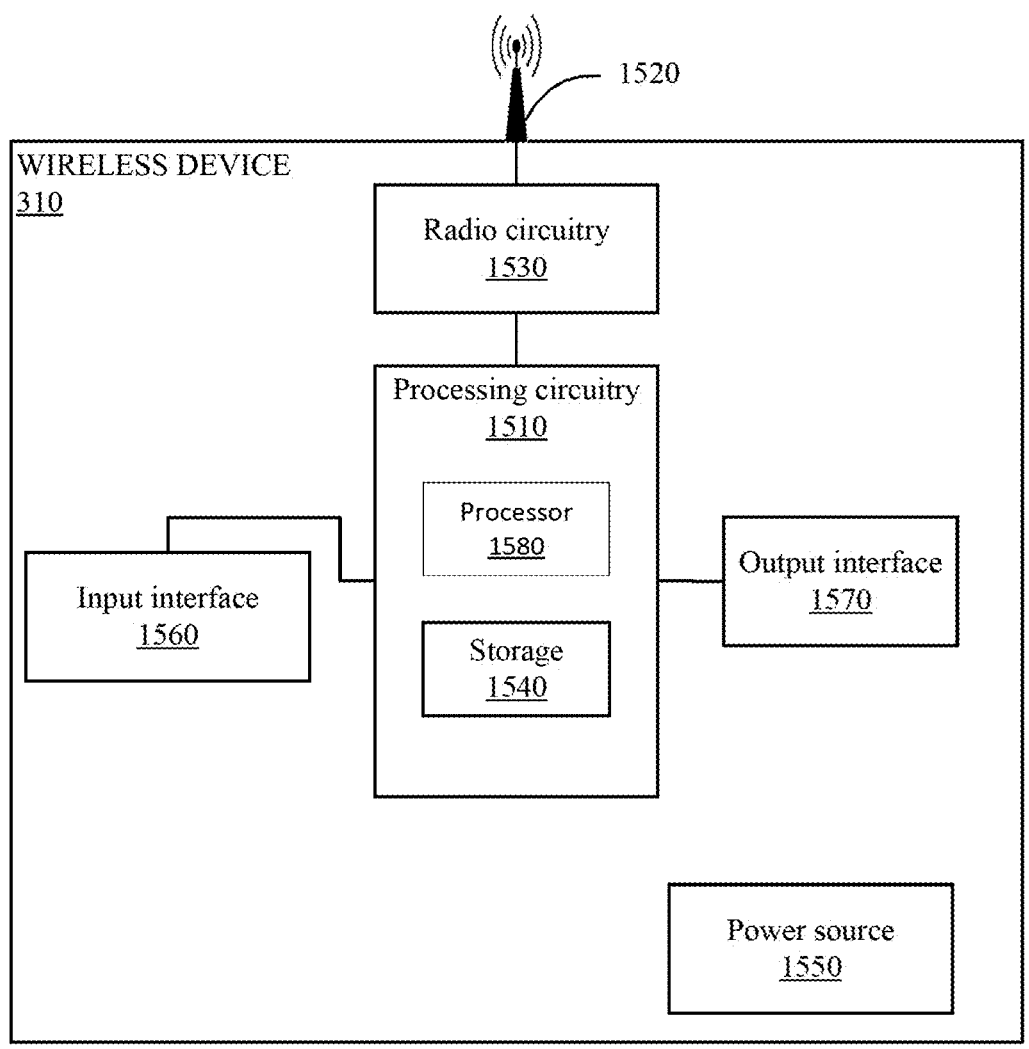
FIG. 15 is a block diagram of a wireless device configured to determine parameters of a precoder according to another embodiment.

FIG. 15 illustrates an example wireless device 310 configured to determine precoder parameters in a wireless communication system, such as 300.

The wireless device 310 includes an antenna 1520, radio front-end circuitry 1530, processing circuitry 1510, a computer-readable storage medium 1540, an input interface 1560 and output interface 1570. Antenna 1520 may include one or more antennas or antenna arrays, and is configured to send and/or receive wireless signals, and is connected to radio front-end circuitry 1530. The radio front-end circuitry 1530 may comprise various filters and amplifiers, is connected to antenna 1520 and processing circuitry 1510, and is configured to condition signals communicated between antenna 1520 and processing circuitry 1510. In certain alternative embodiments, UE 310 may not include radio front-end circuitry 1530, and processing circuitry 1510 may instead be connected to antenna 1520 without radio front-end circuitry 1530.

In some embodiments, the processing circuitry 1510 may comprise a processor 1580 and a memory such as the storage/memory 1540, the processor 1580 being connected to the input and output interfaces 1560 and 1570. The memory 1540 contains instructions which, when executed by the processor, configure processor to perform the one or more functions described in method 1000 of FIG. 10 and 1100 of FIG. 11, for example. The processing circuitry 1510 is similar to 700 of FIG. 7.

Processing circuitry 1510 may comprise and/or be connected to and/or be adapted for accessing (e.g., writing to and/or reading from) memory 1540. Such memory 1540 may be configured to store code executable by control circuitry and/or other data, e.g., data pertaining to communication, e.g., configuration and/or address data of nodes, etc. Processing circuitry 1510 may be configured to control any of the methods described herein and/or to cause such methods to be performed, e.g., by the processor. Corresponding instructions may be stored in the memory 1540, which may be readable and/or readably connected to the processing circuitry 1510. The memory 1540 is similar to memory 1450 of FIG. 14.

Antenna 1520, radio front-end circuitry 1530, processing circuitry 1510, and/or input interface 1560 and output interface 1570 may be configured to perform any transmitting operations described herein as being performed by a wireless device. Any information, data and/or signals may be transmitted to a network node and/or another wireless device. The input interface 1560 and output interface 1570 can be collectively referred to as a network interface, which is connected to the processor and/or memory.

Figure 16:
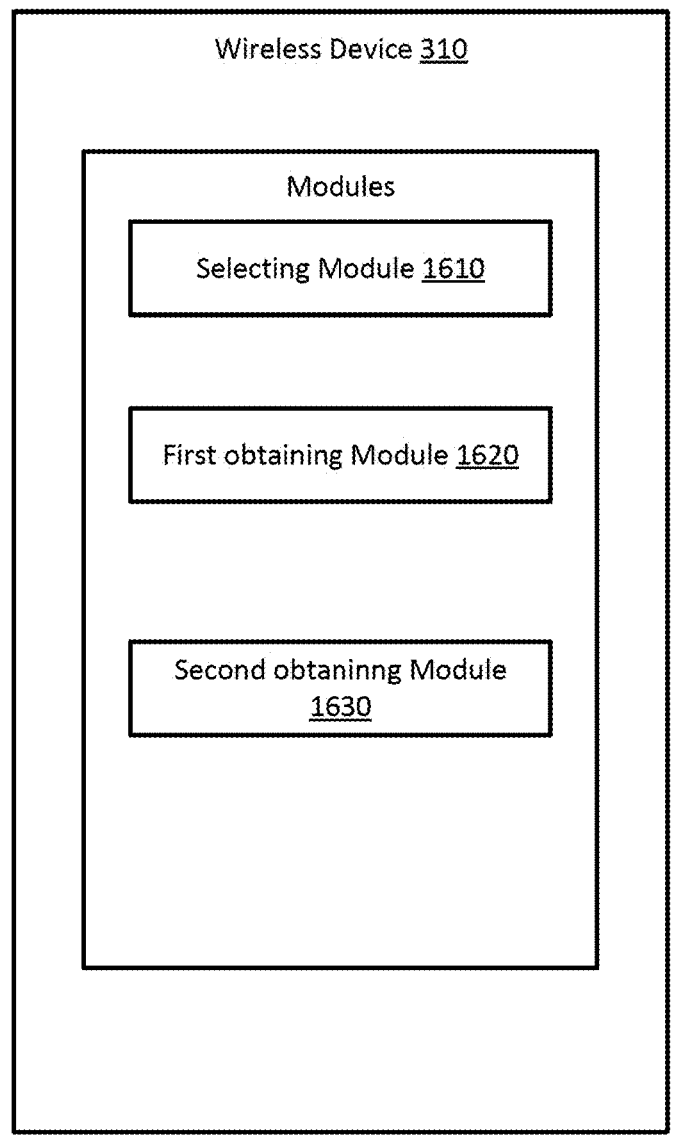
FIG. 16 is a block diagram of a wireless device configured to determine parameters of a precoder according to another embodiment.

FIG. 16 is a block diagram of an example embodiment of a wireless device 310, according to another embodiment, the wireless device 310 configured to determine parameters of a precoder in a wireless communication system. The wireless device 310 includes a selecting module 1610, a first obtaining module 1620 and a second obtaining module 1630. The selecting module 1610 is configured to select a subset of beams from a plurality of orthogonal beams (e.g. corresponding to the columns of the beam space transformation matrix). The first obtaining module 1620 is configured to obtain power levels of the selected subset of beams for generating a first factor. The second obtaining module 1630 is configured to obtain phases of the selected subset of beams for generating a second factor. The wireless device 310 may further include a transmitting module (not shown) configured to transmit/send the precoder parameters to a base station, or network node.

Figure 17:
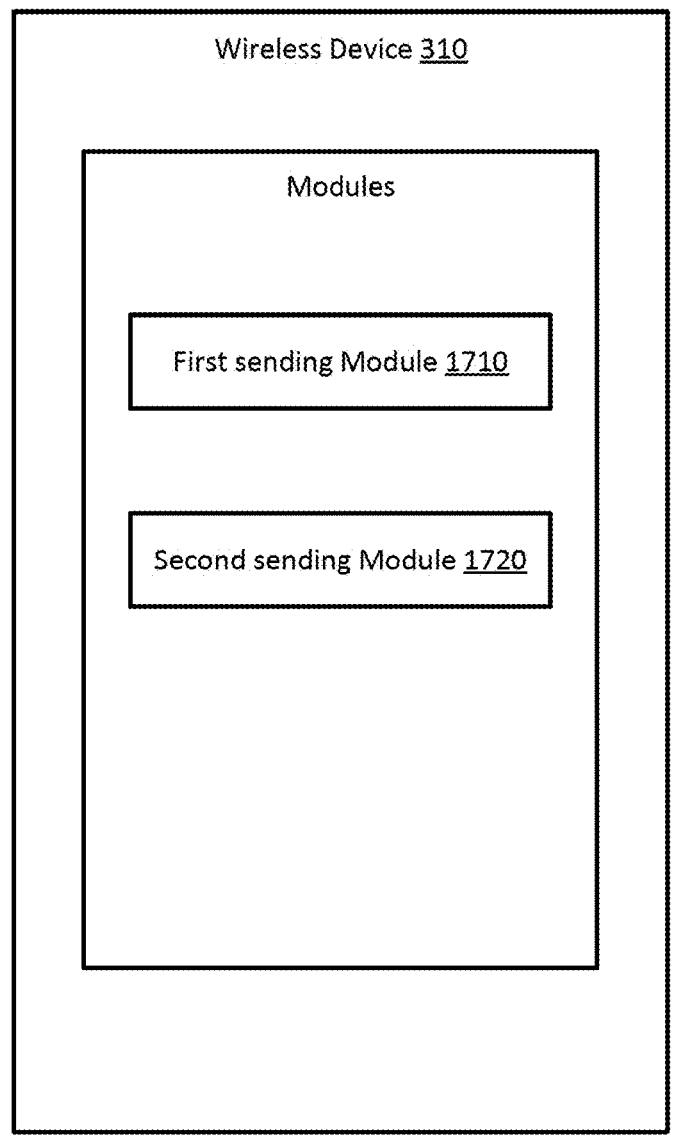
FIG. 17 is a block diagram of a wireless device configured to determine parameters of a precoder according to another embodiment.

FIG. 17 is a block diagram of an example embodiment of a wireless device 310, according to another embodiment, the wireless device 310 configured to send parameters of a precoder to a network node, in a wireless communication system. The wireless device 310 includes a first sending module 1710, and a second sending module 1720. The first sending module 1710 is configured to send to the network node a subset of beams selected from a plurality of orthogonal beams and power levels of the selected subset of beams, for a first frequency granularity. The second sending module 1720 is configured to send phases of the selected subset of beams for a second frequency granularity. In some embodiments, the first and second modules can be combined to form one sending module.

Figure 18:
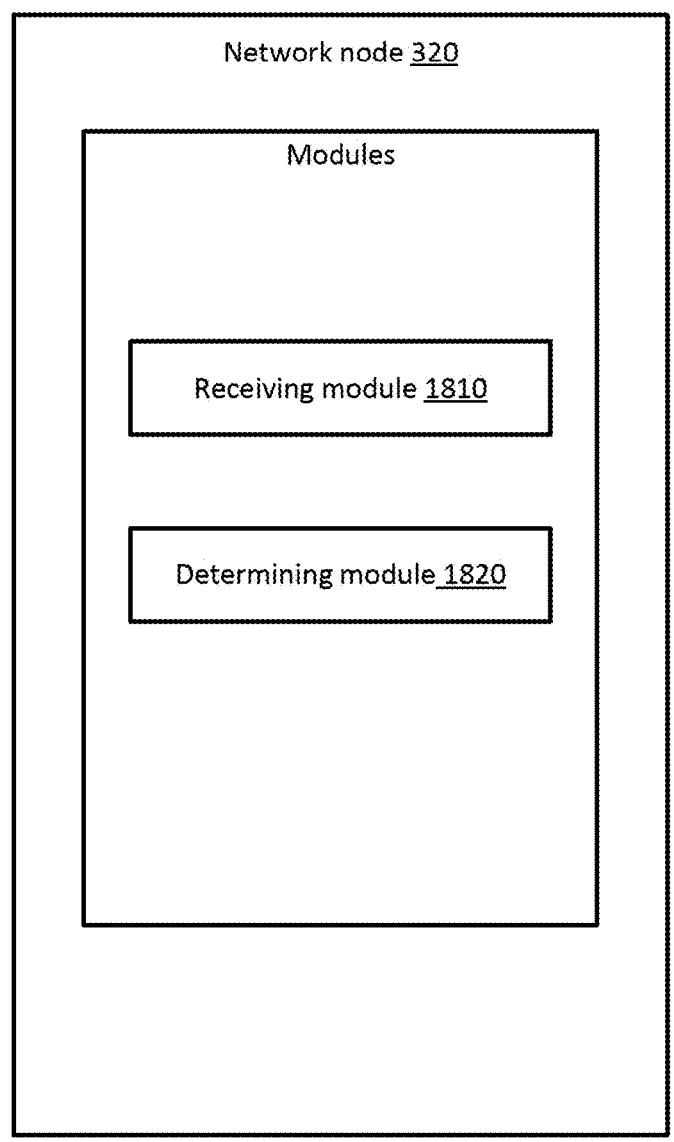
FIG. 18 is a block diagram of a network node configured to determine transmission parameters for a wireless device, according to another embodiment.

FIG. 18 is a block diagram of an example embodiment of a network node 320, such as an eNB or base station, according to another embodiment, the network node 320 configured to determine transmission parameters for a wireless device, in a wireless communication system. The network node 320 comprises a receiving module 1810, and a determining module 1820.

The receiving module 1810 is configured to receive parameters of a precoder, in response to transmitting reference signals to a wireless device. The precoder parameters may include a subset of beams selected from a plurality of orthogonal beams and power levels of the selected subset of beams for a first frequency granularity, and phases of the selected subset of beams for a second frequency granularity. The precoder parameters may also include a subset of beams selected from a plurality of orthogonal beams, a first factor associated with power levels of the selected subset of beams, and a second factor associated with phases of the selected subset of beams.

The determining module 1820 is configured to determine transmission parameters based on the received precoder parameters.

Further exemplary embodiments are given below:

Embodiment 1. A method at a wireless device for determining parameters to enable construction of a precoder codebook structure in a wireless communication system, the method comprising: selecting a subset of columns of a beam space transformation matrix, each column corresponding to a single polarized, SP, beam, each SP beam having a phase and an amplitude; and factoring each column into at least two factors, a first factor having a first frequency granularity and a least a second factor having a second frequency granularity.

Embodiment 2. The method of Embodiment 1 wherein a first factor is an amplitude of an SP beam and a second factor is a phase of an SP beam.

Embodiment 3. The method of Embodiment 2, wherein the amplitude of an SP beam is quantized at a first quantization resolution; and a phase of the SP beam is quantized at a second quantization resolution.

Embodiment 4. The method of Embodiment 1, wherein the columns are selected in polarization pairs of columns, each polarization pair corresponding to a dual polarized, DP, beam.

Embodiment 5. The method of Embodiment 1, further comprising sorting the SP beams in order of power strength and coarsely quantizing a first SP beam that is of less strength than a second SP beam.

Embodiment 6. The method of Embodiment 1, wherein the first granularity is applied across an entire frequency bandwidth and the second granularity is a function of frequency subbands within the frequency bandwidth.

Embodiment 7. The method of Embodiment 1, further comprising transmitting the factors and the frequency granularities to a base station.

Embodiment 8. A wireless device for determining parameters to enable construction of a precoder codebook structure in a wireless communication system, the wireless device comprising: processing circuitry including a memory and a processor, the memory configured to store precoder information, the precoder information including frequency granularities of factors of single polarized, SP, beams; the processor configured to: select a subset of columns of a beam space transformation matrix, each column corresponding to an SP beam; each SP beam having a phase and an amplitude; and factor each column into at least two factors, wherein a first factor has a first frequency granularity and a least a second factor has a second frequency granularity.

Embodiment 9. The wireless device of Embodiment 8, wherein a first factor is an amplitude of an SP beam and a second factor is a phase of an SP beam.

Embodiment 10. The wireless device of Embodiment 9, wherein the amplitude of an SP beam is quantized at a first quantization resolution; and a phase of the SP beam is quantized at a second quantization resolution.

Embodiment 11. The wireless device of Embodiment 8, wherein the columns are selected in polarization pairs of columns, each polarization pair corresponding to a dual polarized, DP, beam.

Embodiment 12. The wireless device of Embodiment 8, further comprising sorting the SP beams in order of power strength and coarsely quantizing a first SP beam that is of less strength than a second SP beam.

Embodiment 13. The wireless device of Embodiment 8, wherein the first granularity is applied across an entire frequency bandwidth and the second granularity is a function of frequency subbands within the frequency bandwidth.

Embodiment 14. The wireless device of Embodiment 8, further comprising a transmitter configured to transmit the factors and the frequency granularities to a base station.

Embodiment 15. A wireless device for determining parameters to enable construction of a precoder codebook structure in a wireless communication system, the wireless device comprising: a memory module configured to store precoder information, the precoder information including frequency granularities of factors of single polarized, SP, beams; a column selection module configured to select a subset of columns of a beam space transformation matrix, each column corresponding to an SP beam; each SP beam having a phase and an amplitude; and a factorization module configured to factor each column into at least two factors, wherein a first factor has a first frequency granularity and a least a second factor has a second frequency granularity.

Embodiment 16. A base station for determining transmission parameters for transmission to a wireless device based on information received from the wireless device, the base station comprising: processing circuitry including a memory and a processor; the memory configured to store precoder information: the processor configured to determine a rank indicator, modulation and coding scheme based on the precoder information; a transmitter configured to transmit the rank indicator, modulation and coding scheme to the wireless device; and a receiver configured to receive, from the wireless device, precoder information including: a subset of columns of a beam space transformation matrix, each column corresponding to a signal polarized, SP, beam, the SP beams having phases and amplitudes; and frequency granularities of factors of the SP beams.

Embodiment 17. A precoder codebook comprising precoders for channel state information, CSI, feedback in a wireless communication system, the precoders in the codebook comprising: a weighted sum of multiple orthogonal beams selected from a rotated two dimensional discrete Fourier transform, DFT, and where an amplitude and a phase of a beam are separated with different frequency granularities.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (which then forms a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings.

What is claimed is:

1. A method in a wireless device for determining a precoder, in a wireless communication system, the method comprising:

receiving reference signals from a network node;
determining a channel estimate based on the received reference signals; and
determining an optimal precoder based on the channel estimate, wherein determining the optimal precoder comprises determining at least one rotation factor and selecting a subset of beams among a plurality of beams rotated by the at least one rotation factor, and wherein the method further comprises:

obtaining power levels of the subset of beams and obtaining phases of the subset of beams; and sending to the network node an indication of the subset of beams, an indication of the power levels of the subset of beams, an indication of the phases of the subset of beams and an indication of the at least one rotation factor, wherein the indication of the power levels is sent with a first frequency granularity and the indication of the phases is sent with a second frequency granularity.

2. The method of claim 1, wherein determining the at least one rotation factor comprises selecting the at least one rotation factor from a set of possible values of rotation factors.

3. The method of claim 2, further comprising selecting a rotation hypothesis given by each of the possible values from the set that maximizes a received power of a signal.

4. The method of claim 1, wherein selecting the subset of beams comprises selecting a subset of best beams from the plurality of rotated beams.

5. The method of claim 4, wherein the best beams comprise beams that have a largest wideband received power.

6. The method of claim 1, wherein the power levels are the same for all layers of a multi-layer transmission and the phases are specific to each individual layer of the multi-layer transmission.

7. The method of claim 1, wherein the first frequency granularity is a frequency bandwidth and the second frequency granularity is a frequency subband.

8. A wireless device for determining a precoder, in a wireless communication system, the wireless device comprising a processing circuitry having a processor, a memory and a network interface both connected to the processor, the memory containing instructions that, when executed, cause the processor to:

receive reference signals from a network node;

determine a channel estimate based on the received reference signals;

determine an optimal precoder based on the channel estimate, wherein the processor determines the optimal precoder by determining at least one rotation factor and by selecting a subset of beams among a plurality of beams rotated by the at least one rotation factor;

obtain power levels of the subset of beams and obtain phases of the subset of beams; and send to the network node an indication of the subset of beams, an indication of the power levels of the subset of beams, an indication of the phases of the subset of beams and an indication of the at least one rotation factor, wherein the processor is configured to send the indication of the power levels with a first frequency granularity and the indication of the phases with a second frequency granularity.

9. A wireless device of claim 8, wherein the processor is configured to determine the at least one rotation factor by selecting the at least one rotation factor from a set of possible values of rotation factors.

10. The wireless device of claim 9, wherein the processor is configured to select a rotation hypothesis given by each of the possible values from the set that maximizes a received power of a signal.

11. The wireless device of claim 8, wherein the processor is configured to select the subset of beams by selecting a subset of best beams from the plurality of rotated beams.

12. The wireless device of claim 11, wherein the best beams comprise beams that have a largest wideband received power.

13. The wireless device of claim 8, wherein the power levels are the same for all layers of a multi-layer transmission and the phases are specific to each individual layer of the multi-layer transmission.

14. The wireless device of claim 8, wherein the first frequency granularity is a frequency bandwidth and the second frequency granularity is a frequency subband.

* * * * *